United States Patent
Lee et al.

(10) Patent No.: US 12,144,019 B2
(45) Date of Patent: Nov. 12, 2024

(54) METHOD AND DEVICE FOR TRANSMITTING PUCCH

(71) Applicant: LG Electronics Inc., Seoul (KR)

(72) Inventors: Seungmin Lee, Seoul (KR); Suckchel Yang, Seoul (KR)

(73) Assignee: LG Electronics Inc., Seoul (KR)

( * ) Notice: Subject to any disclaimer, the term of this patent is extended or adjusted under 35 U.S.C. 154(b) by 472 days.

(21) Appl. No.: 17/437,763

(22) PCT Filed: Mar. 30, 2020

(86) PCT No.: PCT/KR2020/004384
§ 371 (c)(1),
(2) Date: Sep. 9, 2021

(87) PCT Pub. No.: WO2020/204564
PCT Pub. Date: Oct. 8, 2020

(65) Prior Publication Data
US 2022/0141849 A1    May 5, 2022

Related U.S. Application Data

(60) Provisional application No. 62/826,937, filed on Mar. 29, 2019.

(51) Int. Cl.
*H04L 5/14* (2006.01)
*H04L 1/1812* (2023.01)
*H04W 72/566* (2023.01)

(52) U.S. Cl.
CPC ......... *H04W 72/566* (2023.01); *H04L 1/1812* (2013.01)

(58) Field of Classification Search
CPC ....... H04L 1/1812; H04L 1/1671; H04L 5/00; H04L 1/1854; H04L 5/14; H04W 72/566; H04W 72/56
See application file for complete search history.

(56) References Cited

U.S. PATENT DOCUMENTS

2016/0119840 A1    4/2016 Loehr et al.
2021/0211241 A1*   7/2021 Xiong ................... H04L 5/0044
2021/0377963 A1*  12/2021 Wang ................ H04W 72/0453

FOREIGN PATENT DOCUMENTS

KR    20120038399    4/2012

OTHER PUBLICATIONS

Vivo, "Draft TS 38.213 CR on multiplexing HARQ-ACK/SR/CSI in PUCCH," R1-1903718, Presented at 3GPP TSG-RAN WG1 Meeting #96, Athens, Greece, Feb. 25-Mar. 1, 2019, 4 pages.

(Continued)

*Primary Examiner* — Anez C Ebrahim
(74) *Attorney, Agent, or Firm* — Fish & Richardson P.C.

(57) ABSTRACT

According to one embodiment of the present disclosure, provided is a method for a first device to transmit a PUCCH to a base station. The method may comprise: a step for generating multiplexing information including at least one among HARQ feedback information for DL transmission, UL PSR for UL transmission, or SL PSR for SL transmission; and a step for transmitting the multiplexing information to the base station on a single slot through the PUCCH.

11 Claims, 21 Drawing Sheets

(56) References Cited

OTHER PUBLICATIONS

Catt, "CR on overlapping of CSI and PUSCH with slot aggregation," R1-1903759, Presented at 3GPP TSG RAN WG1 Meeting #96, Athens, Greece, Feb. 25-Mar. 1, 4 pages.
Ericsson, "Summary of 7.1.3—Maintenance of UCI Multiplexing on PUCCH," R1-1903784, Presented at 3GPP TSG-RAN WG1 Meeting #96, Athens, Greece, Feb. 25-Mar. 1, 2019, 4 pages.

* cited by examiner

FIG. 4
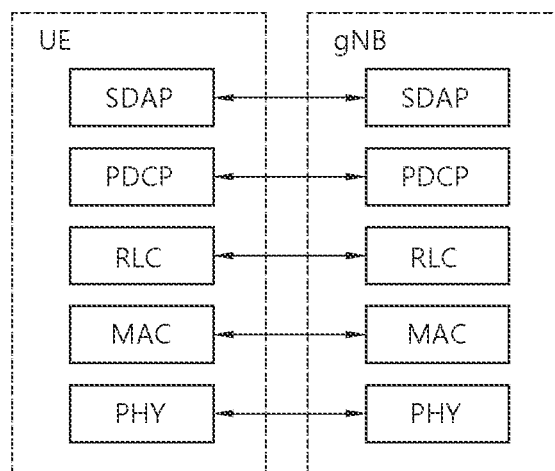
(a)
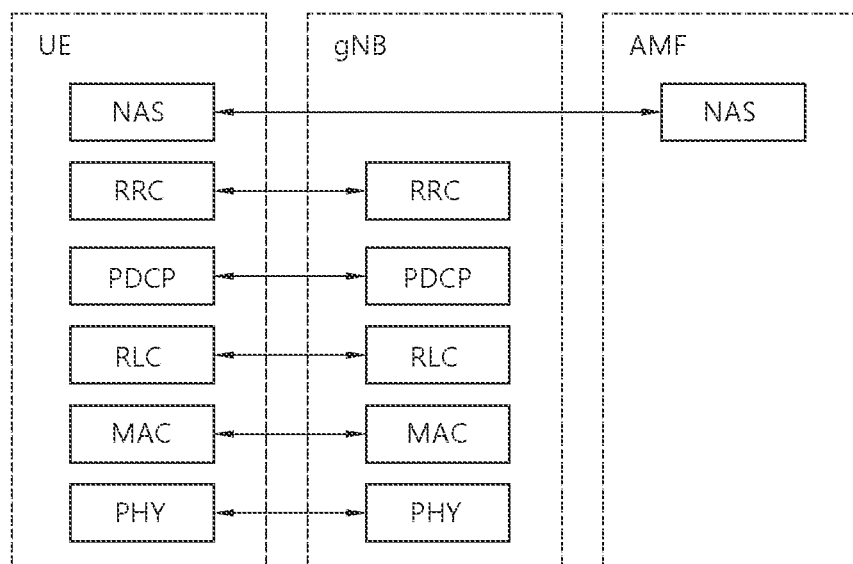
(b)

FIG. 8
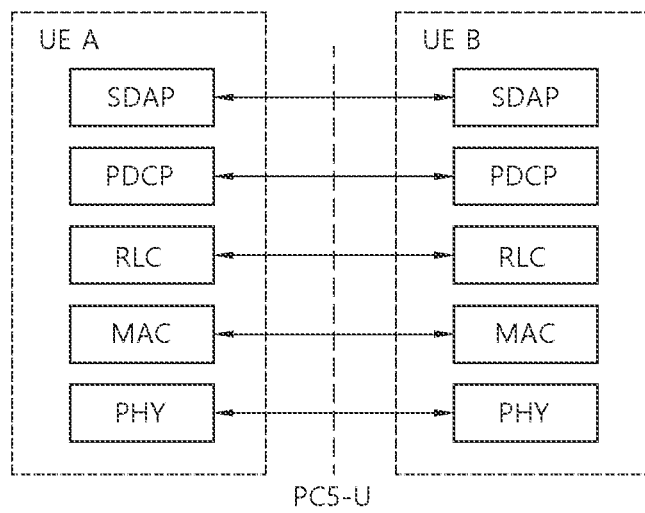
(a)
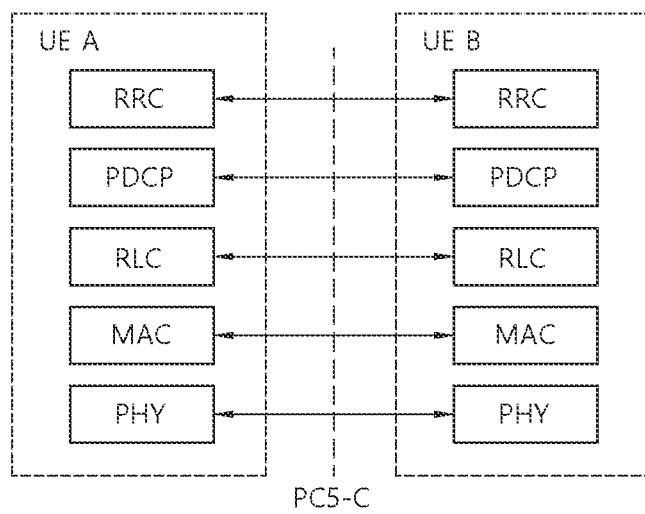
(b)

FIG. 15 receiving multiplexing information generated in a first apparatus on a single slot through a PUCCH — S1510

METHOD AND DEVICE FOR TRANSMITTING PUCCH

CROSS-REFERENCE TO RELATED APPLICATIONS

This application is a National Stage application under 35 U.S.C. § 371 of International Application No. PCT/KR2020/004384, filed on Mar. 30, 2020, which claims the benefit of U.S. Provisional Application No. 62/826,937, filed on Mar. 29, 2019. The disclosures of the prior applications are incorporated by reference in their entirety.

BACKGROUND OF THE DISCLOSURE

Field of the Disclosure

This disclosure relates to a wireless communication system.

RELATED ART

Sidelink (SL) communication is a communication scheme in which a direct link is established between user equipments (UEs) and the UEs exchange voice and data directly with each other without intervention of an evolved Node B (eNB). SL communication is under consideration as a solution to the overhead of an eNB caused by rapidly increasing data traffic.

Vehicle-to-everything (V2X) refers to a communication technology through which a vehicle exchanges information with another vehicle, a pedestrian, an object having an infrastructure (or infra) established therein, and the like. The V2X may be divided into 4 types, such as vehicle-to-vehicle (V2V), vehicle-to-infrastructure (V2I), vehicle-to-network (V2N), and vehicle-to-pedestrian (V2P). The V2X communication may be provided via a PC5 interface and/or Uu interface.

As a wider range of communication devices require larger communication capacities, the need for mobile broadband communication that is more enhanced than the existing radio access technology (RAT) is rising. Accordingly, discussions are made on services and user equipment (UE) that are sensitive to reliability and latency. A next-generation radio access technology that is based on the enhanced mobile broadband communication, massive machine-type communication (MTC), ultra-reliable and low latency communication (URLLC), and the like, may be referred to as a new radio access technology (RAT) or new radio (NR). Here, the NR may also support vehicle-to-everything (V2X) communication.

FIG. 1 is a drawing for describing V2X communication based on NR, compared to V2X communication based on RAT used before NR. The embodiment of FIG. 1 may be combined with various embodiments of the present disclosure.

Regarding V2X communication, a scheme of providing a safety service, based on a V2X message, such as a basic safety message (BSM), a cooperative awareness message (CAM), and a decentralized environmental notification message (DENM), is focused in the discussion on the RAT used before the NR. The V2X message may include position information, dynamic information, attribute information, or the like. For example, a UE may transmit a periodic message type CAM and/or an event triggered message type DENM to another UE.

For example, the CAM may include dynamic state information of the vehicle such as direction and speed, static data of the vehicle such as a size, and basic vehicle information such as an exterior illumination state, route details, or the like. For example, the UE may broadcast the CAM, and latency of the CAM may be less than 100 ms. For example, the UE may generate the DENM and transmit it to another UE in an unexpected situation such as a vehicle breakdown, accident, or the like. For example, all vehicles within a transmission range of the UE may receive the CAM and/or the DENM. In this case, the DENM may have a higher priority than the CAM.

Thereafter, regarding V2X communication, various V2X scenarios are proposed in NR. For example, the various V2X scenarios may include vehicle platooning, advanced driving, extended sensors, remote driving, or the like.

For example, based on the vehicle platooning, vehicles may move together by dynamically forming a group. For example, in order to perform platoon operations based on the vehicle platooning, the vehicles belonging to the group may receive periodic data from a leading vehicle. For example, the vehicles belonging to the group may decrease or increase an interval between the vehicles by using the periodic data.

For example, based on the advanced driving, the vehicle may be semi-automated or fully automated. For example, each vehicle may adjust trajectories or maneuvers, based on data obtained from a local sensor of a proximity vehicle and/or a proximity logical entity. In addition, for example, each vehicle may share driving intention with proximity vehicles.

For example, based on the extended sensors, raw data, processed data, or live video data obtained through the local sensors may be exchanged between a vehicle, a logical entity, a UE of pedestrians, and/or a V2X application server. Therefore, for example, the vehicle may recognize a more improved environment than an environment in which a self-sensor is used for detection.

For example, based on the remote driving, for a person who cannot drive or a remote vehicle in a dangerous environment, a remote driver or a V2X application may operate or control the remote vehicle. For example, if a route is predictable such as public transportation, cloud computing based driving may be used for the operation or control of the remote vehicle. In addition, for example, an access for a cloud-based back-end service platform may be considered for the remote driving.

Meanwhile, a scheme of specifying service requirements for various V2X scenarios such as vehicle platooning, advanced driving, extended sensors, remote driving, or the like is discussed in NR-based V2X communication.

SUMMARY OF THE DISCLOSURE

A technical problem of the present disclosure is to provide an UU communication method with a base station and an apparatus (or UE) for performing the same.

Another technical problem of the present disclosure is to provide a sidelink (SL) communication method between apparatuses (or terminals) based on V2X communication and an apparatus (or terminal) for performing the same.

The other technical problem of the present disclosure is to provide a method and apparatus for transmitting multiplexing information including at least one of downlink (DL) transmission hybrid automatic repeat request (HARQ) feedback information, UL PSR (uplink Positive Scheduling Request) for UL transmission or sidelink (SL) PSR for SL transmission to a base station.

According to one embodiment of the present disclosure, a method for a first apparatus to transmit a physical uplink control channel (PUCCH) to a base station is provided. The method includes: generating multiplexing information including at least one of hybrid automatic repeat request (HARQ) feedback information for downlink (DL) transmission, an uplink (UL) positive scheduling request (PSR) for UL transmission or a sidelink (SL) PSR for SL transmission and transmitting the multiplexing information in a single slot to the base station through the PUCCH.

According to another embodiment of the present disclosure, a first apparatus for transmitting a physical uplink control channel (PUCCH) to a base station is provided. The first apparatus includes at least one memory to store instructions, at least one transceiver, and at least one processor to connect the at least one memory and the at least one transceiver, wherein the at least one processor is configured to: generate multiplexing information including at least one of hybrid automatic repeat request (HARQ) feedback information for downlink (DL) transmission, an uplink (UL) positive scheduling request (PSR) for UL transmission or a sidelink (SL) PSR for SL transmission, and control the at least one transceiver to transmit the multiplexing information in a single slot to the base station through the PUCCH.

According to the other embodiment of the present disclosure, an apparatus for controlling a first terminal is provided. The apparatus includes at least one processor and at least one computer memory that is connected to be executable by the at least one processor and stores instructions, wherein, when the at least one processor executes the instructions, the first terminal is configured to: generate multiplexing information including at least one of hybrid automatic repeat request (HARQ) feedback information for downlink (DL) transmission, an uplink (UL) positive scheduling request (PSR) for UL transmission or a sidelink (SL) PSR for SL transmission, and transmit the multiplexing information in a single slot to a base station through the PUCCH.

According to the other embodiment of the present disclosure, a non-transitory computer-readable storage medium that stores instructions (or indications) is provided. When executed by at least one processor of the non-transitory computer-readable storage medium: multiplexing information including at least one of hybrid automatic repeat request (HARQ) feedback information for downlink (DL) transmission, an uplink (UL) positive scheduling request (PSR) for UL transmission or a sidelink (SL) PSR for SL transmission is generated by a first apparatus, and the multiplexing information in a single slot is transmitted to a base station through the PUCCH by the first apparatus.

According to the other embodiment of the present disclosure, a method for a base station to receive a PUCCH from a first apparatus is provided. The method includes: receiving multiplexing information generated in the first apparatus from the first apparatus through the PUCCH on a single slot, wherein the multiplexing information includes at least one of HARQ feedback information for DL transmission, an UL PSR for UL transmission or an SL PSR for SL transmission.

According to the other embodiment of the present disclosure, a base station for receiving a PUCCH from a first apparatus is provided. The base station includes at least one memory to store instructions, at least one transceiver, and at least one processor to connect the at least one memory and the at least one transceiver, wherein the at least one processor is configured to: receive multiplexing information generated in the first apparatus from the first apparatus through the PUCCH on a single slot, wherein the multiplexing information includes at least one of HARQ feedback information for DL transmission, an UL PSR for UL transmission or an SL PSR for SL transmission.

According to the present disclosure, a terminal (or apparatus) can effectively perform UU communication or SL communication.

According to the present disclosure, vehicle-to-everything (V2X) communication can be effectively performed between apparatuses (or terminals).

According to the present disclosure, the terminal may transmit multiplexing information including at least one of HARQ feedback information for a DL transmission, an UL PSR for an UL transmission or an SL PSR for an SL transmission to a base station efficiently.

BRIEF DESCRIPTION OF THE DRAWINGS

FIG. 4 shows a radio protocol architecture in accordance with an embodiment of the present disclosure.

FIG. 8 shows a radio protocol architecture for a SL communication in accordance with an embodiment of the present disclosure.

FIG. 15 shows an operation of a second apparatus according to an embodiment of the present disclosure.

DESCRIPTION OF EXEMPLARY EMBODIMENTS

Figure 1:
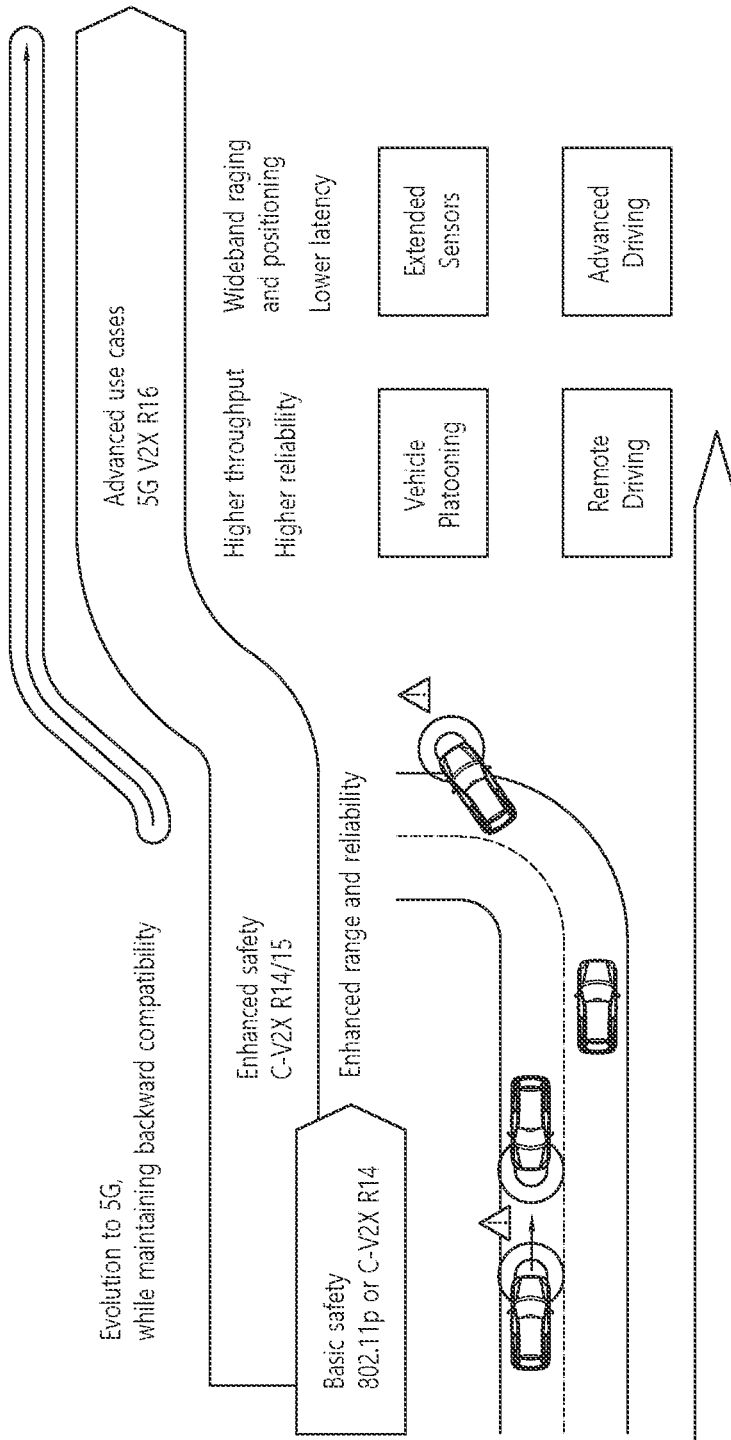
FIG. 1 is a drawing for describing V2X communication based on NR, compared to V2X communication based on RAT used before NR.

In the present specification, "A or B" may mean "only A", "only B" or "both A and B." In other words, in the present specification, "A or B" may be interpreted as "A and/or B". For example, in the present specification, "A, B, or C" may mean "only A", "only B", "only C", or "any combination of A, B, C".

A slash (/) or comma used in the present specification may mean "and/or". For example, "A/B" may mean "A and/or B". Accordingly, "A/B" may mean "only A", "only B", or "both A and B". For example, "A, B, C" may mean "A, B, or C".

In the present specification, "at least one of A and B" may mean "only A", "only B", or "both A and B". In addition, in the present specification, the expression "at least one of A or B" or "at least one of A and/or B" may be interpreted as "at least one of A and B".

In addition, in the present specification, "at least one of A, B, and C" may mean "only A", "only B", "only C", or "any combination of A, B, and C". In addition, "at least one of A, B, or C" or "at least one of A, B, and/or C" may mean "at least one of A, B, and C".

In addition, a parenthesis used in the present specification may mean "for example". Specifically, when indicated as "control information (PDCCH)", it may mean that "PDCCH" is proposed as an example of the "control information". In other words, the "control information" of the present specification is not limited to "PDCCH", and "PDDCH" may be proposed as an example of the "control information". In addition, when indicated as "control information (i.e., PDCCH)", it may also mean that "PDCCH" is proposed as an example of the "control information".

A technical feature described individually in one figure in the present specification may be individually implemented, or may be simultaneously implemented.

The technology described below may be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), and the like. The CDMA may be implemented with a radio technology, such as universal terrestrial radio access (UTRA) or CDMA-2000. The TDMA may be implemented with a radio technology, such as global system for mobile communications (GSM)/general packet ratio service (GPRS)/enhanced data rate for GSM evolution (EDGE). The OFDMA may be implemented with a radio technology, such as institute of electrical and electronics engineers (IEEE) 802.11 (Wi-Fi), IEEE 802.16 (WiMAX), IEEE 802.20, evolved UTRA (E-UTRA), and the like. IEEE 802.16m is an evolved version of IEEE 802.16e and provides backward compatibility with a system based on the IEEE 802.16e. The UTRA is part of a universal mobile telecommunication system (UMTS). 3rd generation partnership project (3GPP) long term evolution (LTE) is part of an evolved UMTS (E-UMTS) using the E-UTRA. The 3GPP LTE uses the OFDMA in a downlink and uses the SC-FDMA in an uplink. LTE-advanced (LTE-A) is an evolution of the LTE.

5G NR is a successive technology of LTE-A corresponding to a new Clean-slate type mobile communication system having the characteristics of high performance, low latency, high availability, and the like. 5G NR may use resources of all spectrum available for usage including low frequency bands of less than 1 GHz, middle frequency bands ranging from 1 GHz to 10 GHz, high frequency (millimeter waves) of 24 GHz or more, and the like.

For clarity in the description, the following description will mostly focus on LTE-A or 5G NR. However, technical features according to an embodiment of the present disclosure will not be limited only to this.

Figure 2:
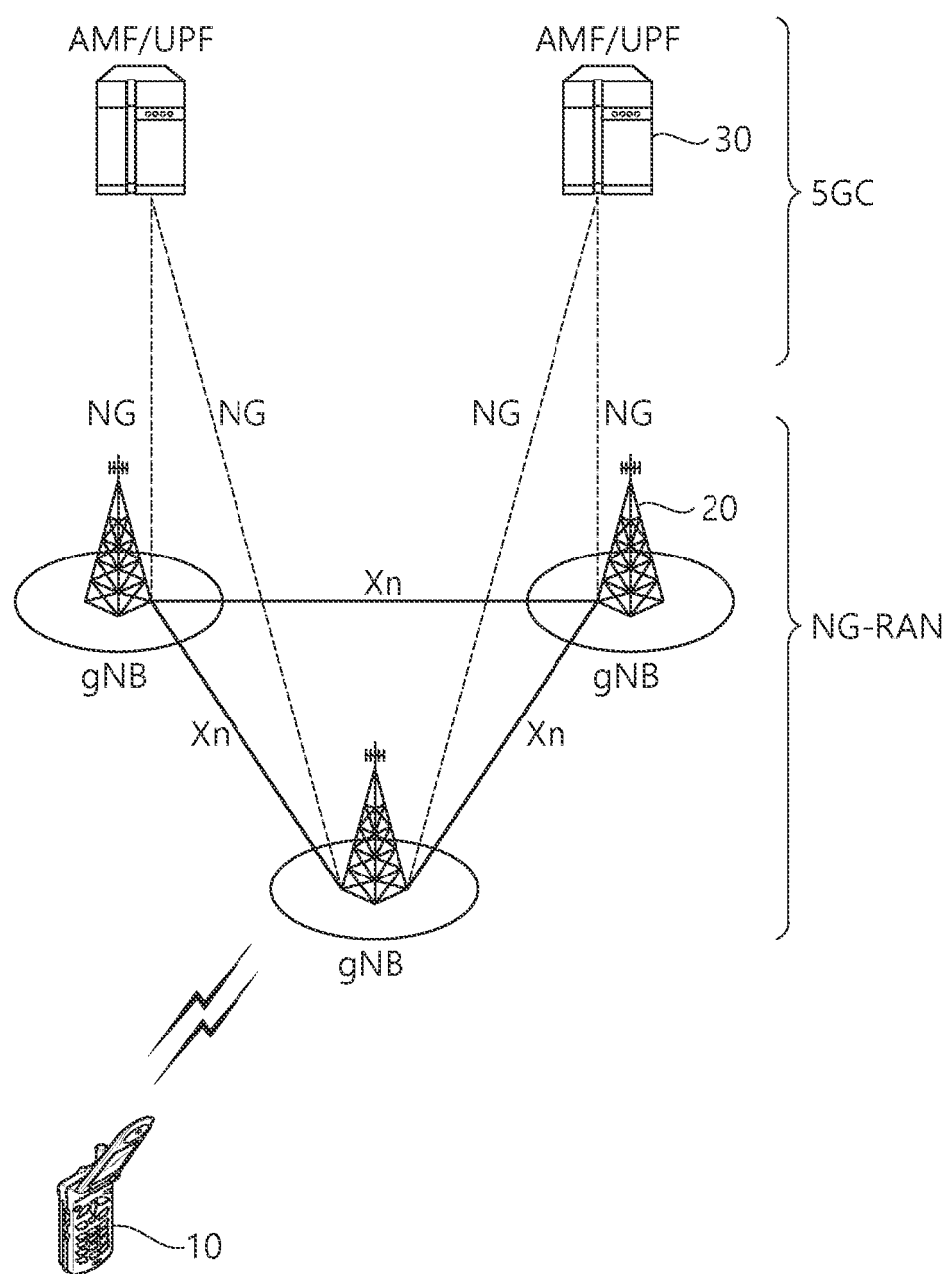
FIG. 2 shows a structure of an NR system in accordance with an embodiment of the present disclosure.

FIG. 2 shows a structure of an NR system in accordance with an embodiment of the present disclosure. The embodiment of FIG. 2 may be combined with various embodiments of the present disclosure.

Referring to FIG. 2, a next generation-radio access network (NG-RAN) may include a BS 20 providing a UE 10 with a user plane and control plane protocol termination. For example, the BS 20 may include a next generation-Node B (gNB) and/or an evolved-NodeB (eNB). For example, the UE 10 may be fixed or mobile and may be referred to as other terms, such as a mobile station (MS), a user terminal (UT), a subscriber station (SS), a mobile terminal (MT), a wireless device, and the like. For example, the BS may be referred to as a fixed station which communicates with the UE 10 and may be referred to as other terms, such as a base transceiver system (BTS), an access point (AP), and the like.

The embodiment of FIG. 2 exemplifies a case where only the gNB is included. The BSs 20 may be connected to one another via Xn interface. The BS 20 may be connected to one another via 5th generation (5G) core network (5GC) and NG interface. More specifically, the BSs 20 may be connected to an access and mobility management function (AMF) 30 via NG-C interface, and may be connected to a user plane function (UPF) 30 via NG-U interface.

Figure 3:
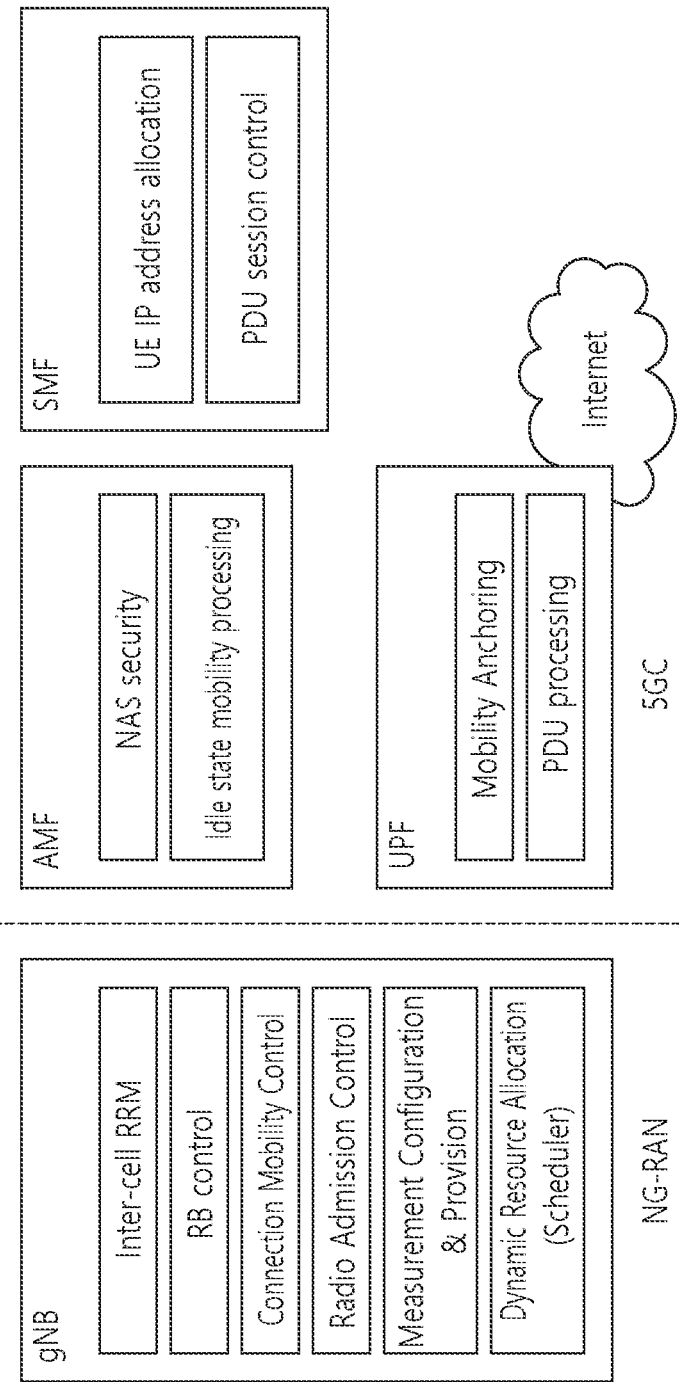
FIG. 3 shows a functional division between an NG-RAN and a 5GC in accordance with an embodiment of the present disclosure.

FIG. 3 shows a functional division between an NG-RAN and a 5GC in accordance with an embodiment of the present disclosure.

Referring to FIG. 3, the gNB may provide functions, such as Inter Cell Radio Resource Management (RRM), Radio Bearer (RB) control, Connection Mobility Control, Radio Admission Control, Measurement Configuration & Provision, Dynamic Resource Allocation, and the like. An AMF may provide functions, such as non access stratum (NAS) security, idle state mobility processing, and the like. A UPF may provide functions, such as mobility anchoring, protocol data unit (PDU) processing, and the like. A session management function (SMF) may provide functions, such as user equipment (UE) Internet protocol (IP) address allocation, PDU session control, and the like.

Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

FIG. 4 shows a radio protocol architecture in accordance with an embodiment of the present disclosure. The embodiment of FIG. 4 may be combined with various embodiments of the present disclosure. Specifically, (a) of FIG. 4 shows a radio protocol architecture for a user plane, and (b) of FIG. 4 shows a radio protocol architecture for a control plane. The user plane corresponds to a protocol stack for user data transmission, and the control plane corresponds to a protocol stack for control signal transmission.

Referring to FIG. 4, a physical layer provides an upper layer with an information transfer service through a physical channel. The physical layer is connected to a medium access control (MAC) layer which is an upper layer of the physical layer through a transport channel. Data is transferred between the MAC layer and the physical layer through the transport channel. The transport channel is classified according to how and with what characteristics data is transmitted through a radio interface.

Between different physical layers, i.e., a physical layer of a transmitter and a physical layer of a receiver, data are transferred through the physical channel. The physical channel is modulated using an orthogonal frequency division multiplexing (OFDM) scheme, and utilizes time and frequency as a radio resource.

The MAC layer provides services to a radio link control (RLC) layer, which is a higher layer of the MAC layer, via a logical channel. The MAC layer provides a function of mapping multiple logical channels to multiple transport channels. The MAC layer also provides a function of logical channel multiplexing by mapping multiple logical channels to a single transport channel. The MAC layer provides data transfer services over logical channels.

The RLC layer performs concatenation, segmentation, and reassembly of Radio Link Control Service Data Unit (RLC SDU). In order to ensure diverse quality of service (QoS) required by a radio bearer (RB), the RLC layer provides three types of operation modes, i.e., a transparent mode (TM), an unacknowledged mode (UM), and an acknowledged mode (AM). An AM RLC provides error correction through an automatic repeat request (ARQ).

A radio resource control (RRC) layer is defined only in the control plane. The RRC layer serves to control the logical channel, the transport channel, and the physical channel in association with configuration, reconfiguration and release of RBs. The RB is a logical path provided by the first layer (i.e., the physical layer or the PHY layer) and the second layer (i.e., the MAC layer, the RLC layer, and the packet data convergence protocol (PDCP) layer) for data delivery between the UE and the network.

Functions of a packet data convergence protocol (PDCP) layer in the user plane include user data delivery, header compression, and ciphering. Functions of a PDCP layer in the control plane include control-plane data delivery and ciphering/integrity protection.

A service data adaptation protocol (SDAP) layer is defined only in a user plane. The SDAP layer performs mapping between a Quality of Service (QoS) flow and a data radio bearer (DRB) and QoS flow ID (QFI) marking in both DL and UL packets.

The configuration of the RB implies a process for specifying a radio protocol layer and channel properties to provide a particular service and for determining respective detailed parameters and operations. The RB can be classified into two types, i.e., a signaling RB (SRB) and a data RB (DRB). The SRB is used as a path for transmitting an RRC message in the control plane. The DRB is used as a path for transmitting user data in the user plane.

When an RRC connection is established between an RRC layer of the UE and an RRC layer of the E-UTRAN, the UE is in an RRC_CONNECTED state, and, otherwise, the UE may be in an RRC_IDLE state. In case of the NR, an RRC_INACTIVE state is additionally defined, and a UE being in the RRC_INACTIVE state may maintain its connection with a core network whereas its connection with the BS is released.

Data is transmitted from the network to the UE through a downlink transport channel. Examples of the downlink transport channel include a broadcast channel (BCH) for transmitting system information and a downlink-shared channel (SCH) for transmitting user traffic or control messages. Traffic of downlink multicast or broadcast services or the control messages can be transmitted on the downlink-SCH or an additional downlink multicast channel (MCH). Data is transmitted from the UE to the network through an uplink transport channel. Examples of the uplink transport channel include a random access channel (RACH) for transmitting an initial control message and an uplink SCH for transmitting user traffic or control messages.

Examples of logical channels belonging to a higher channel of the transport channel and mapped onto the transport channels include a broadcast channel (BCCH), a paging control channel (PCCH), a common control channel (CCCH), a multicast control channel (MCCH), a multicast traffic channel (MTCH), or the like The physical channel includes several OFDM symbols in a time domain and several sub-carriers in a frequency domain. One sub-frame includes a plurality of OFDM symbols in the time domain. A resource block is a unit of resource allocation, and consists of a plurality of OFDM symbols and a plurality of sub-carriers. Further, each sub-frame may use specific sub-carriers of specific OFDM symbols (e.g., a first OFDM symbol) of a corresponding subframe for a physical downlink control channel (PDCCH), i.e., an L1/L2 control channel. A transmission time interval (TTI) is a unit time of subframe transmission.

Figure 5:
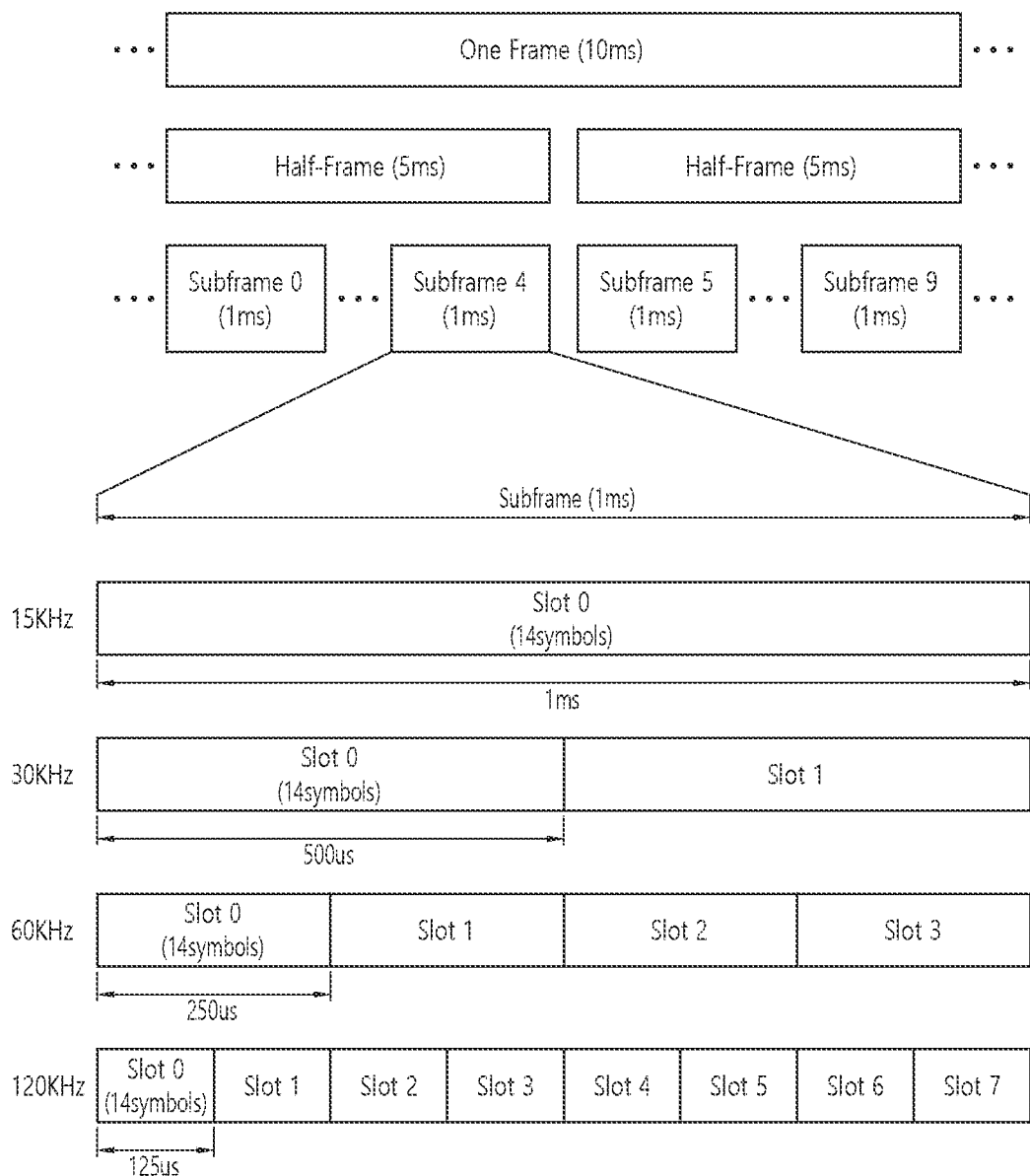
FIG. 5 shows a structure of an NR system in accordance with an embodiment of the present disclosure.

FIG. 5 shows a structure of an NR system in accordance with an embodiment of the present disclosure. The embodiment of FIG. 5 may be combined with various embodiments of the present disclosure.

Referring to FIG. 5, in the NR, a radio frame may be used for performing uplink and downlink transmission. A radio frame has a length of 10 ms and may be defined to be configured of two half-frames (HFs). A half-frame may include five 1 ms subframes (SFs). A subframe (SF) may be divided into one or more slots, and the number of slots within a subframe may be determined in accordance with subcarrier spacing (SCS). Each slot may include 12 or 14 OFDM(A) symbols according to a cyclic prefix (CP).

In case of using a normal CP, each slot may include 14 symbols. In case of using an extended CP, each slot may include 12 symbols. Here, a symbol may include an OFDM symbol (or CP-OFDM symbol) and a Single Carrier-FDMA (SC-FDMA) symbol (or Discrete Fourier Transform-spread-OFDM (DFT-s-OFDM) symbol).

Table 1 shown below represents an example of a number of symbols per slot ($N^{slot}_{symb}$) a number slots per frame ($N^{frame,u}_{slot}$), and a number of slots per sub-frame ($N^{subframe,u}_{slot}$) in accordance with an SCS configuration (u), in a case where a normal CP is used.

TABLE 1

| SCS ($15*2^u$) | $N^{slot}_{symb}$ | $N^{frame,u}_{slot}$ | $N^{subframe,u}_{slot}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |

TABLE 1-continued

| SCS (15*2^u) | $N^{slot}_{symb}$ | $N^{frame, u}_{slot}$ | $N^{subframe, u}_{slot}$ |
|---|---|---|---|
| 120 KHz (u = 3) | 14 | 80 | 8 |
| 240 KHz (u = 4) | 14 | 160 | 16 |

Table 2 shows an example of a number of symbols per slot, a number of slots per frame, and a number of slots per subframe in accordance with the SCS, in a case where an extended CP is used.

TABLE 2

| SCS (15*2^u) | $N^{slot}_{symb}$ | $N^{frame, u}_{slot}$ | $N^{subframe, u}_{slot}$ |
|---|---|---|---|
| 60 KHz (u = 2) | 12 | 40 | 4 |

In an NR system, OFDM(A) numerologies (e.g., SCS, CP length, and the like) between multiple cells being integrate to one UE may be differently configured. Accordingly, a (absolute time) duration (or section) of a time resource (e.g., subframe, slot or TTI) (collectively referred to as a time unit (TU) for simplicity) being configured of the same number of symbols may be differently configured in the integrated cells.

In the NR, multiple numerologies or SCSs for supporting diverse 5G services may be supported. For example, in case an SCS is 15 kHz, a wide area of the conventional cellular bands may be supported, and, in case an SCS is 30 kHz/60 kHz a dense-urban, lower latency, wider carrier bandwidth may be supported. In case the SCS is 60 kHz or higher, a bandwidth that is greater than 24.25 GHz may be used in order to overcome phase noise.

An NR frequency band may be defined as two different types of frequency ranges. The two different types of frequency ranges may be FR1 and FR2. The values of the frequency ranges may be changed (or varied), and, for example, the two different types of frequency ranges may be as shown below in Table A3. Among the frequency ranges that are used in an NR system, FR1 may mean a "sub 6 GHz range", and FR2 may mean an "above 6 GHz range" and may also be referred to as a millimeter wave (mmW).

TABLE 3

| Frequency Range designation | Corresponding frequency range | Subcarrier Spacing (SCS) |
|---|---|---|
| FR1 | 450 MHz-6000 MHz | 15, 30, 60 kHz |
| FR2 | 24250 MHz-52600 MHz | 60, 120, 240 kHz |

As described above, the values of the frequency ranges in the NR system may be changed (or varied). For example, as shown below in Table A4, FR1 may include a band within a range of 410 MHz to 7125 MHz. More specifically, FR1 may include a frequency band of 6 GHz (or 5850, 5900, 5925 MHz, and the like) and higher. For example, a frequency band of 6 GHz (or 5850, 5900, 5925 MHz, and the like) and higher being included in FR1 mat include an unlicensed band. The unlicensed band may be used for diverse purposes, e.g., the unlicensed band for vehicle-specific communication (e.g., automated driving).

TABLE 4

| Frequency Range designation | Corresponding frequency range | Subcarrier Spacing (SCS) |
|---|---|---|
| FR1 | 410 MHz-7125 MHz | 15, 30, 60 kHz |
| FR2 | 24250 MHz-52600 MHz | 60, 120, 240 kHz |

Figure 6:
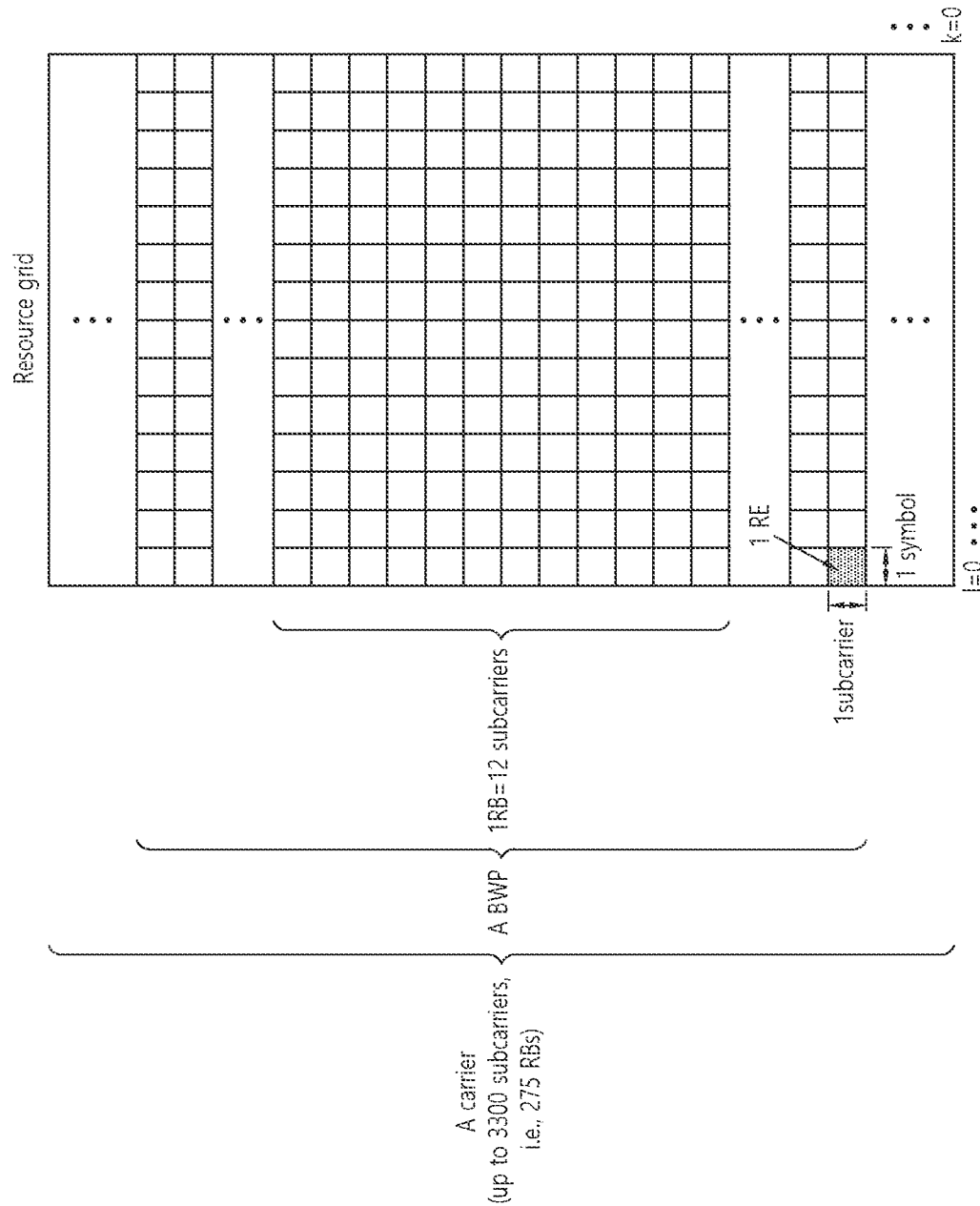
FIG. 6 shows a structure of a slot of an NR frame in accordance with an embodiment of the present disclosure.

FIG. 6 shows a structure of a slot of an NR frame in accordance with an embodiment of the present disclosure.

Referring to FIG. 6, a slot includes a plurality of symbols in a time domain. For example, in case of a normal CP, one slot may include 14 symbols. However, in case of an extended CP, one slot may include 12 symbols. Alternatively, in case of a normal CP, one slot may include 7 symbols. However, in case of an extended CP, one slot may include 6 symbols.

A carrier includes a plurality of subcarriers in a frequency domain. A Resource Block (RB) may be defined as a plurality of consecutive subcarriers (e.g., 12 subcarriers) in the frequency domain. A bandwidth part (BWP) may be defined as a plurality of consecutive (physical) resource blocks ((P)RBs) in the frequency domain, and the BWP may correspond to one numerology (e.g., SCS, CP length, and the like). A carrier may include a maximum of N number BWPs (e.g., 5 BWPs). Data communication may be performed via an activated BWP. Each element may be referred to as a Resource Element (RE) within a resource grid and one complex symbol may be mapped to each element.

Meanwhile, a radio interface between a UE and another UE or a radio interface between the UE and a network may consist of an L1 layer, an L2 layer, and an L3 layer. In various embodiments of the present disclosure, the L1 layer may imply a physical layer. In addition, for example, the L2 layer may imply at least one of a MAC layer, an RLC layer, a PDCP layer, and an SDAP layer. In addition, for example, the L3 layer may imply an RRC layer.

Hereinafter, a bandwidth part (BWP) and a carrier will be described.

The BWP may be a set of consecutive physical resource blocks (PRBs) in a given numerology. The PRB may be selected from consecutive sub-sets of common resource blocks (CRBs) for the given numerology on a given carrier.

When using bandwidth adaptation (BA), a reception bandwidth and transmission bandwidth of a UE are not necessarily as large as a bandwidth of a cell, and the reception bandwidth and transmission bandwidth of the BS may be adjusted. For example, a network/BS may inform the UE of bandwidth adjustment. For example, the UE receive information/configuration for bandwidth adjustment from the network/BS. In this case, the UE may perform bandwidth adjustment based on the received information/configuration. For example, the bandwidth adjustment may include an increase/decrease of the bandwidth, a position change of the bandwidth, or a change in subcarrier spacing of the bandwidth.

For example, the bandwidth may be decreased during a period in which activity is low to save power. For example, the position of the bandwidth may move in a frequency domain. For example, the position of the bandwidth may move in the frequency domain to increase scheduling flexibility. For example, the subcarrier spacing of the bandwidth may be changed. For example, the subcarrier spacing of the bandwidth may be changed to allow a different service. A subset of a total cell bandwidth of a cell may be called a bandwidth part (BWP). The BA may be performed when the BS/network configures the BWP to the UE and the BS/network informs the UE of the BWP currently in an active state among the configured BWPs.

For example, the BWP may be at least any one of an active BWP, an initial BWP, and/or a default BWP. For example, the UE may not monitor downlink radio link quality in a DL BWP other than an active DL BWP on a primary cell (PCell). For example, the UE may not receive PDCCH, PDSCH, or CSI-RS (excluding RRM) outside the active DL BWP. For example, the UE may not trigger a channel state information (CSI) report for the inactive DL BWP. For example, the UE may not transmit PUCCH or PUSCH outside an active UL BWP. For example, in a downlink case, the initial BWP may be given as a consecutive RB set for an RMSI CORESET (configured by PBCH). For example, in an uplink case, the initial BWP may be given by SIB for a random access procedure. For example, the default BWP may be configured by a higher layer. For example, an initial value of the default BWP may be an initial DL BWP. For energy saving, if the UE fails to detect DCI during a specific period, the UE may switch the active BWP of the UE to the default BWP.

Meanwhile, the BWP may be defined for SL. The same SL BWP may be used in transmission and reception. For example, a transmitting UE may transmit an SL channel or an SL signal on a specific BWP, and a receiving UE may receive the SL channel or the SL signal on the specific BWP. In a licensed carrier, the SL BWP may be defined separately from a Uu BWP, and the SL BWP may have configuration signaling separate from the Uu BWP. For example, the UE may receive a configuration for the SL BWP from the BS/network. The SL BWP may be (pre-)configured in a carrier with respect to an out-of-coverage NR V2X UE and an RRC_IDLE UE. For the UE in the RRC_CONNECTED mode, at least one SL BWP may be activated in the carrier.

Figure 7:
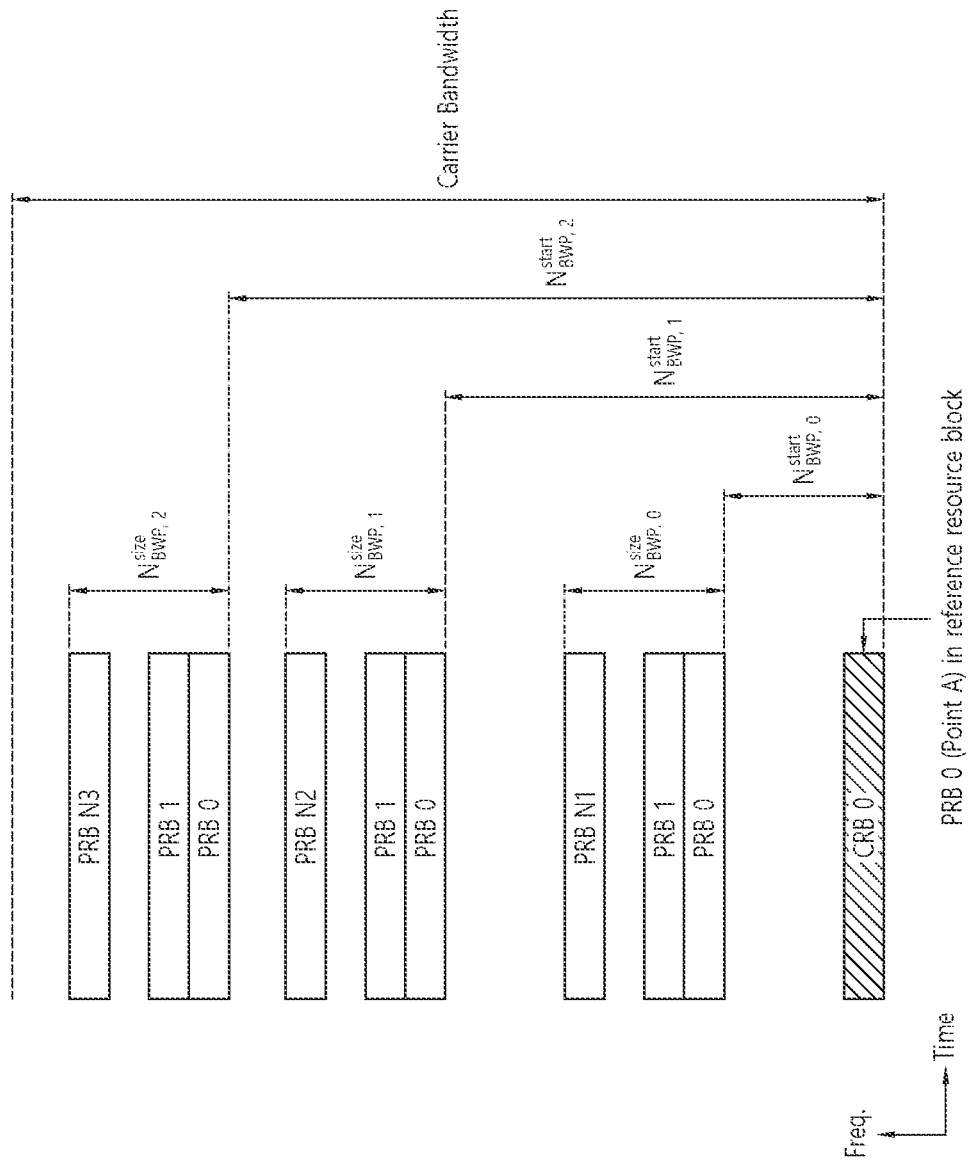
FIG. 7 shows an example of a BWP in accordance with an embodiment of the present disclosure.

FIG. 7 shows an example of a BWP in accordance with an embodiment of the present disclosure. The embodiment of FIG. 7 may be combined with various embodiments of the present disclosure. It is assumed in the embodiment of FIG. 7 that the number of BWPs is 3.

Referring to FIG. 7, a common resource block (CRB) may be a carrier resource block numbered from one end of a carrier band to the other end thereof. In addition, the PRB may be a resource block numbered within each BWP. A point A may indicate a common reference point for a resource block grid.

The BWP may be configured by a point A, an offset $N^{start}_{BWP}$ from the point A, and a bandwidth $N^{size}_{BWP}$. For example, the point A may be an external reference point of a PRB of a carrier in which a subcarrier 0 of all numerologies (e.g., all numerologies supported by a network on that carrier) is aligned. For example, the offset may be a PRB interval between a lowest subcarrier and the point A in a given numerology. For example, the bandwidth may be the number of PRBs in the given numerology.

Hereinafter, V2X or SL communication will be described.

FIG. 8 shows a radio protocol architecture for a SL communication in accordance with an embodiment of the present disclosure. The embodiment of FIG. 8 may be combined with various embodiments of the present disclosure. More specifically, (a) of FIG. 8 shows a user plane protocol stack, and (b) of FIG. 8 shows a control plane protocol stack.

Hereinafter, a sidelink synchronization signal (SLSS) and synchronization information will be described.

The SLSS may include a primary sidelink synchronization signal (PSSS) and a secondary sidelink synchronization signal (SSSS), as an SL-specific sequence. The PSSS may be referred to as a sidelink primary synchronization signal (S-PSS), and the SSSS may be referred to as a sidelink secondary synchronization signal (S-SSS). For example, length-127 M-sequences may be used for the S-PSS, and length-127 gold sequences may be used for the S-SSS. For example, a UE may use the S-PSS for initial signal detection and for synchronization acquisition. For example, the UE may use the S-PSS and the S-SSS for acquisition of detailed synchronization and for detection of a synchronization signal ID.

A physical sidelink broadcast channel (PSBCH) may be a (broadcast) channel for transmitting default (system) information which must be first known by the UE before SL signal transmission/reception. For example, the default information may be information related to SLSS, a duplex mode (DM), a time division duplex (TDD) uplink/downlink (UL/DL) configuration, information related to a resource pool, a type of an application related to the SLSS, a subframe offset, broadcast information, or the like. For example, for evaluation of PSBCH performance, in NR V2X, a payload size of the PSBCH may be 56 bits including 24-bit CRC.

The S-PSS, the S-SSS, and the PSBCH may be included in a block format (e.g., SL synchronization signal (SS)/PSBCH block, hereinafter, sidelink-synchronization signal block (S-SSB)) supporting periodical transmission. The S-SSB may have the same numerology (i.e., SCS and CP length) as a physical sidelink control channel (PSCCH)/physical sidelink shared channel (PSSCH) in a carrier, and a transmission bandwidth may exist within a (pre-)configured sidelink (SL) BWP. For example, the S-SSB may have a bandwidth of 11 resource blocks (RBs). For example, the PSBCH may exist across 11 RBs. In addition, a frequency position of the S-SSB may be (pre-)configured. Accordingly, the UE does not have to perform hypothesis detection at frequency to discover the S-SSB in the carrier.

Figure 9:
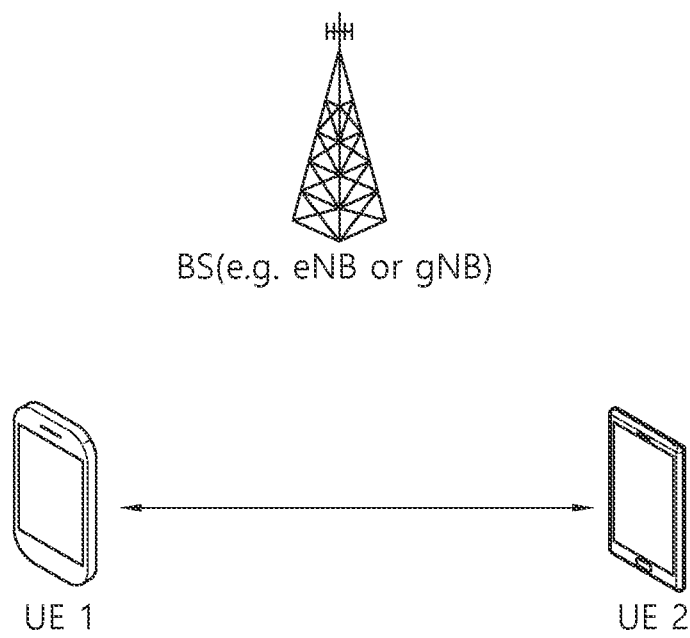
FIG. 9 shows a UE performing V2X or SL communication in accordance with an embodiment of the present disclosure.

FIG. 9 shows a UE performing V2X or SL communication in accordance with an embodiment of the present disclosure. The embodiment of FIG. 9 may be combined with various embodiments of the present disclosure.

Referring to FIG. 9, in V2X or SL communication, the term 'UE' may generally imply a UE of a user. However, if a network equipment such as a BS transmits/receives a signal according to a communication scheme between UEs, the BS may also be regarded as a sort of the UE. For example, a UE 1 may be a first apparatus 100, and a UE 2 may be a second apparatus 200.

For example, the UE 1 may select a resource unit corresponding to a specific resource in a resource pool which implies a set of series of resources. In addition, the UE 1 may transmit an SL signal by using the resource unit. For example, a resource pool in which the UE 1 is capable of transmitting a signal may be configured to the UE 2 which is a receiving UE, and the signal of the UE 1 may be detected in the resource pool.

Herein, if the UE 1 is within a connectivity range of the BS, the BS may inform the UE 1 of the resource pool. Otherwise, if the UE 1 is out of the connectivity range of the BS, another UE may inform the UE 1 of the resource pool, or the UE 1 may use a pre-configured resource pool.

In general, the resource pool may be configured in unit of a plurality of resources, and each UE may select a unit of one or a plurality of resources to use it in SL signal transmission thereof.

Hereinafter, resource allocation in SL will be described.

Figure 10:
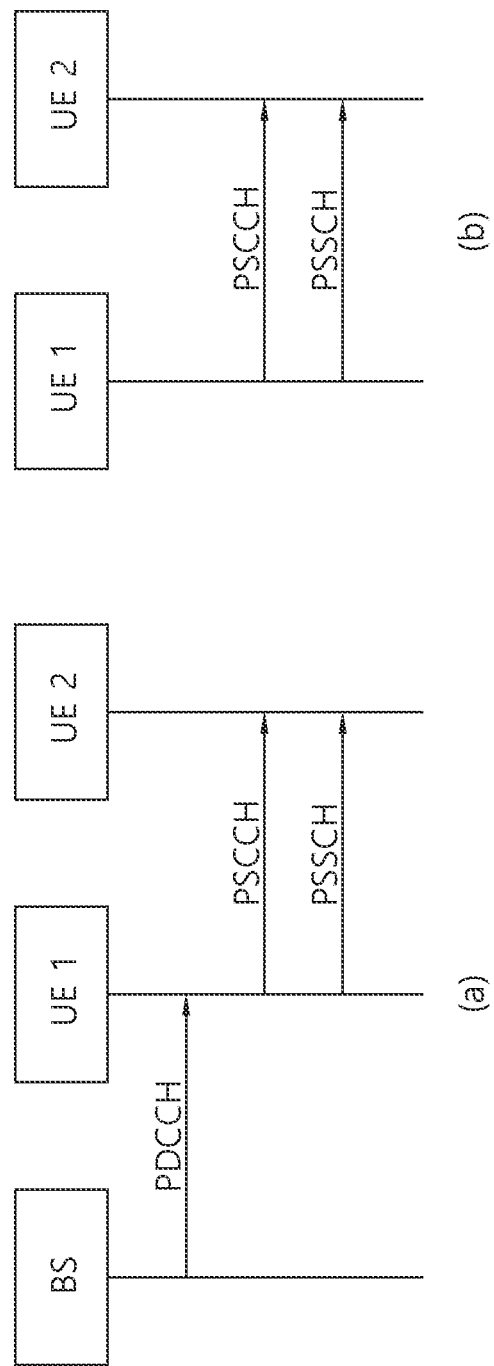
FIG. 10 shows a procedure of performing V2X or SL communication by a UE based on a transmission mode in accordance with an embodiment of the present disclosure.

FIG. 10 shows a procedure of performing V2X or SL communication by a UE based on a transmission mode in accordance with an embodiment of the present disclosure. The embodiment of FIG. 10 may be combined with various embodiments of the present disclosure. In various embodiments of the present disclosure, the transmission mode may be called a mode or a resource allocation mode. Hereinafter, for convenience of explanation, in LTE, the transmission mode may be called an LTE transmission mode. In NR, the transmission mode may be called an NR resource allocation mode.

For example, (a) of FIG. 10 shows a UE operation related to an LTE transmission mode 1 or an LTE transmission mode 3. Alternatively, for example, (a) of FIG. 10 of shows a UE operation related to an NR resource allocation mode 1. For example, the LTE transmission mode 1 may be applied to general SL communication, and the LTE transmission mode 3 may be applied to V2X communication.

For example, (b) of FIG. 10 shows a UE operation related to an LTE transmission mode 2 or an LTE transmission mode 4. Alternatively, for example, (b) of FIG. 10 shows a UE operation related to an NR resource allocation mode 2.

Referring to (a) of FIG. 10, in the LTE transmission mode 1, the LTE transmission mode 3, or the NR resource allocation mode 1, a BS may schedule an SL resource to be used by the UE for SL transmission. For example, the BS may perform resource scheduling to a UE 1 through a PDCCH (more specifically, downlink control information (DCI)), and the UE 1 may perform V2X or SL communication with respect to a UE 2 according to the resource scheduling. For example, the UE 1 may transmit a sidelink control information (SCI) to the UE 2 through a physical sidelink control channel (PSCCH), and thereafter transmit data based on the SCI to the UE 2 through a physical sidelink shared channel (PSSCH).

Referring to (b) of FIG. 10, in the LTE transmission mode 2, the LTE transmission mode 4, or the NR resource allocation mode 2, the UE may determine an SL transmission resource within an SL resource configured by a BS/network or a pre-configured SL resource. For example, the configured SL resource or the pre-configured SL resource may be a resource pool. For example, the UE may autonomously select or schedule a resource for SL transmission. For example, the UE may perform SL communication by autonomously selecting a resource within a configured resource pool. For example, the UE may autonomously select a resource within a selective window by performing a sensing and resource (re)selection procedure. For example, the sensing may be performed in unit of subchannels. In addition, the UE 1 which has autonomously selected the resource within the resource pool may transmit the SCI to the UE 2 through a PSCCH, and thereafter may transmit data based on the SCI to the UE 2 through a PSSCH.

Figure 11:
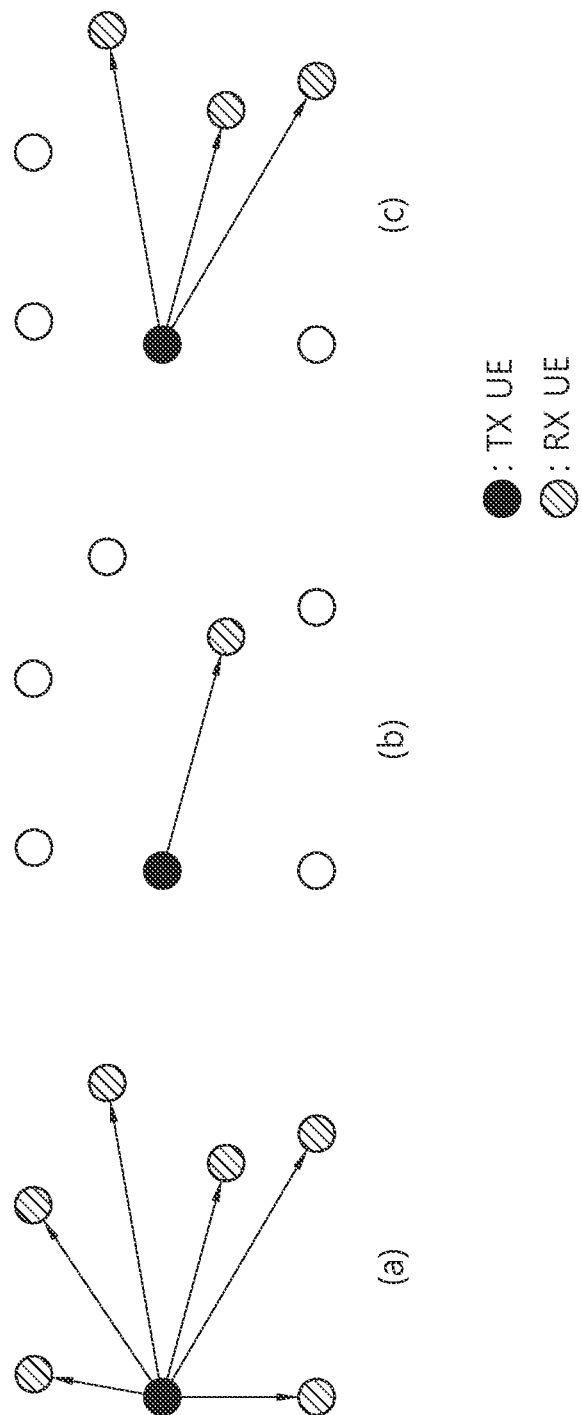
FIG. 11 shows three cast types in accordance with an embodiment of the present disclosure.

FIG. 11 shows three cast types in accordance with an embodiment of the present disclosure. The embodiment of FIG. 11 may be combined with various embodiments of the present disclosure. Specifically, (a) of FIG. 11 shows broadcast-type SL communication, (b) of FIG. 11 shows unicast type-SL communication, and (c) of FIG. 11 shows groupcast-type SL communication. In case of the unicast-type SL communication, a UE may perform one-to-one communication with respect to another UE. In case of the groupcast-type SL transmission, the UE may perform SL communication with respect to one or more UEs in a group to which the UE belongs. In various embodiments of the present disclosure, SL groupcast communication may be replaced with SL multicast communication, SL one-to-many communication, or the like.

Meanwhile, in sidelink communication, a UE may need to effectively select a resource for sidelink transmission. Hereinafter, a method in which a UE effectively selects a resource for sidelink transmission and an apparatus supporting the method will be described according to various embodiments of the present disclosure. In various embodiments of the present disclosure, the sidelink communication may include V2X communication.

At least one scheme proposed according to various embodiments of the present disclosure may be applied to at least any one of unicast communication, groupcast communication, and/or broadcast communication.

At least one method proposed according to various embodiment of the present embodiment may apply not only to sidelink communication or V2X communication based on a PC5 interface or an SL interface (e.g., PSCCH, PSSCH, PSBCH, PSSS/SSSS, or the like) or V2X communication but also to sidelink communication or V2X communication based on a Uu interface (e.g., PUSCH, PDSCH, PDCCH, PUCCH, or the like).

In various embodiments of the present disclosure, a receiving operation of a UE may include a decoding operation and/or receiving operation of a sidelink channel and/or sidelink signal (e.g., PSCCH, PSSCH, PSFCH, PSBCH, PSSS/SSSS, or the like). The receiving operation of the UE may include a decoding operation and/or receiving operation of a WAN DL channel and/or a WAN DL signal (e.g., PDCCH, PDSCH, PSS/SSS, or the like). The receiving operation of the UE may include a sensing operation and/or a CBR measurement operation. In various embodiments of the present disclosure, the sensing operation of the UE may include a PSSCH-RSRP measurement operation based on a PSSCH DM-RS sequence, a PSSCH-RSRP measurement operation based on a PSSCH DM-RS sequence scheduled by a PSCCH successfully decoded by the UE, a sidelink RSSU (S-RSSI) measurement operation, and an S-RSSI measurement operation based on a V2X resource pool related subchannel. In various embodiments of the disclosure, a transmitting operation of the UE may include a transmitting operation of a sidelink channel and/or a sidelink signal (e.g., PSCCH, PSSCH, PSFCH, PSBCH, PSSS/SSSS, or the like). The transmitting operation of the UE may include a transmitting operation of a WAN UL channel and/or a WAN UL signal (e.g., PUSCH, PUCCH, SRS, or the like). In various embodiments of the present disclosure, a synchronization signal may include SLSS and/or PSBCH.

In various embodiments of the present disclosure, a configuration may include signaling, signaling from a network, a configuration from the network, and/or a pre-configuration from the network. In various embodiments of the present disclosure, a definition may include signaling, signaling from a network, a configuration form the network, and/or a pre-configuration from the network. In various embodiment of the present disclosure, a designation may include signaling, signaling from a network, a configuration from the network, and/or a pre-configuration from the network.

In various embodiments of the present disclosure, a ProSe per packet priority (PPPP) may be replaced with a ProSe per packet reliability (PPPR), and the PPPR may be replaced with the PPPP. For example, it may mean that the smaller the PPPP value, the higher the priority, and that the greater the PPPP value, the lower the priority. For example, it may mean that the smaller the PPPR value, the higher the reliability, and that the greater the PPPR value, the lower the reliability. For example, a PPPP value related to a service, packet, or message related to a high priority may be smaller than a PPPP value related to a service, packet, or message related to a low priority. For example, a PPPR value related to a service, packet, or message related to a high reliability may be smaller than a PPPR value related to a service, packet, or message related to a low reliability In various embodiments of the present disclosure, a session may include at least any one of a unicast session (e.g., unicast session for sidelink), a groupcast/multicast session (e.g., groupcast/multicast session for sidelink), and/or a broadcast session (e.g., broadcast session for sidelink).

In various embodiments of the present disclosure, a carrier may be interpreted as at least any one of a BWP and/or a resource pool. For example, the carrier may include at least any one of the BWP and/or the resource pool. For example, the carrier may include one or more BWPs. For example, the BWP may include one or more resource pools.

Meanwhile, in the case of a sidelink in the NR V2X communication system, at least two sidelink resource allocation modes may be defined. In case of mode 1, the base station may schedule a sidelink resource to be used by the terminal for sidelink transmission. In the case of mode 2, the terminal may determine a sidelink transmission resource within a sidelink resource configured by the base station/network or a preconfigured sidelink resource. The configured sidelink resource or the preconfigured sidelink resource may be a resource/resource pool.

Hereinafter, a method for a terminal to transmit a scheduling request (SR) for performing uplink communication and/or NR sidelink mode 1 communication and an apparatus supporting the same will be described.

In one example, the scheduling request for uplink communication of the terminal may indicate a signal for the terminal to request scheduling from the base station when there is uplink data to be transmitted by the terminal. The scheduling request for performing NR sidelink mode 1 communication of the terminal may be a signal for the terminal to request scheduling from the base station when there is sidelink data to be transmitted by the terminal. Upon receiving the scheduling request for uplink communication transmitted by the terminal, the base station may transmit an uplink grant including uplink scheduling information to the terminal through a PDCCH, and upon receiving the scheduling request for performing the NR sidelink mode 1 communication transmitted by the terminal, the base station may transmit a sidelink resource including sidelink scheduling information to the terminal through the PDCCH. The terminal receiving the uplink grant from the base station may transmit a PUSCH using the uplink grant, and the terminal receiving the sidelink resource from the base station may perform sidelink communication using the sidelink resource. At this time, when a buffer status report (BSR) for uplink communication or a buffer status report is triggered for transmission for NR sidelink mode 1 communication, the base station may transmit an uplink grant for transmitting each buffer status report to the terminal. Upon receiving the uplink grant for transmitting the buffer status report, the terminal may transmit the BSR by using the uplink grant.

In one example, the base station may independently configure a scheduling request resource (SR resource) for uplink communication of the terminal and a scheduling request resource for performing NR sidelink mode 1 communication. In another example, the base station may independently transmit scheduling request configuration information for uplink communication of the terminal and scheduling request configuration information for performing NR sidelink mode 1 communication.

In one example, the terminal may independently receive a scheduling request resource (SR resource) for uplink communication of the terminal and a scheduling request resource for performing NR sidelink mode 1 communication from the base station. The terminal may transmit a scheduling request for uplink communication and a scheduling request for performing NR sidelink mode 1 communication through each of the independently configured scheduling request resources. In another example, the terminal may receive scheduling request configuration information for uplink communication and scheduling request configuration information for performing NR sidelink mode 1 communication from the base station. The terminal may transmit a scheduling request for uplink communication and a scheduling request for performing NR sidelink mode 1 communication based on each of the scheduling configuration information.

Considering the reliability of PUCCH transmission and urgency related to NR sidelink mode 1 communication from a terminal perspective, when PUCCH transmission of HARQ feedback information for downlink (hereinafter, 'HARQ feedback information for DL transmission), PUCCH transmission of positive scheduling request (SR) for uplink transmission (hereinafter, 'UL PSR') and PUCCH transmission of positive SR for NR sidelink mode 1 communication (hereinafter, 'SL PSR') overlap in one slot, it is required to efficiently multiplex at least one of the HARQ feedback information for the DL transmission, the UL PSR or the SL PSR. In this disclosure, the HARQ feedback information may be ACK/NACK, ACK or NACK, and the like. When PUCCH transmission of HARQ feedback information for DL transmission, PUCCH transmission of UL PSR, and PUCCH transmission of SL PSR overlap, the terminal may be configured to transmit HARQ feedback information for DL transmission, UL PSR and SL PSR in one slot through PUCCH or may mean a case in which the terminal intends to transmit HARQ feedback information for DL transmission, UL PSR, and SL PSR through PUCCH within one slot (would transmit). In addition, the reliability of the PUCCH transmission may be related to the size and format of the PUCCH payload. In addition, the urgency of the NR sidelink mode 1 communication may be related to a requirement related to a sidelink service (eg, a latency budget) and the like.

Figure 12:
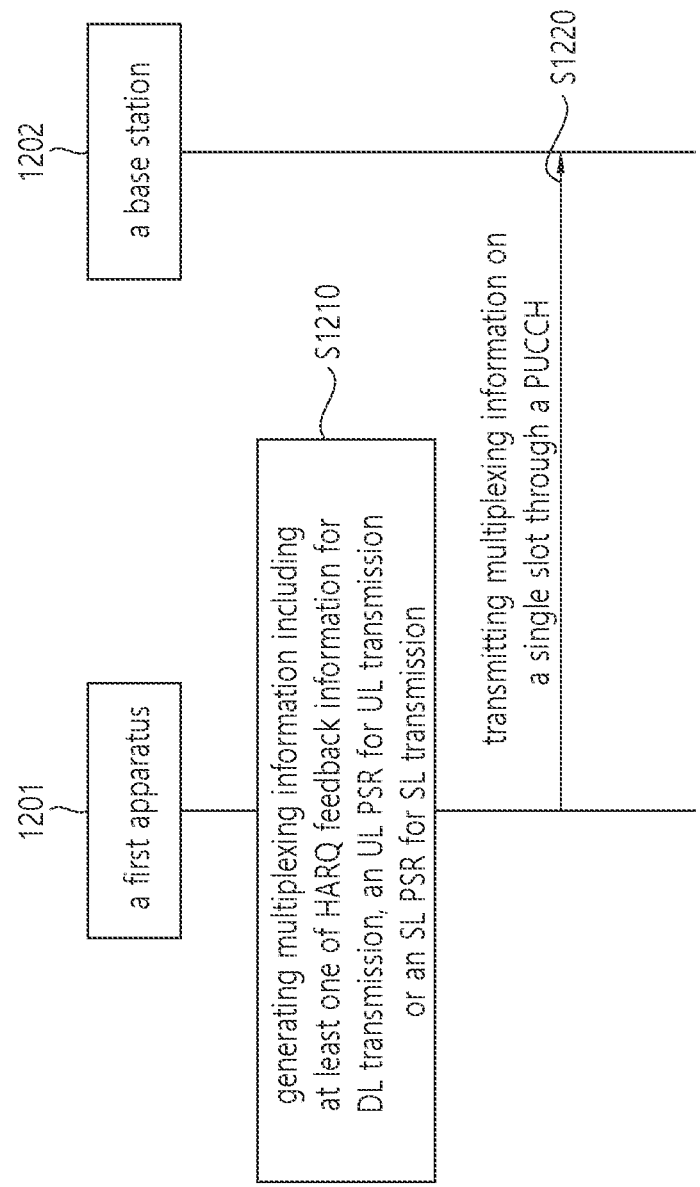
FIG. 12 shows a method for a first apparatus to transmit multiplexing information to a base station according to an embodiment of the present disclosure.

FIG. 12 shows a method for a first apparatus to transmit multiplexing information to a base station according to an embodiment of the present disclosure.

In the present disclosure, "apparatus" may represent a terminal, user equipment (UE), a vehicle terminal, a vehicle UE, and the like.

Referring to FIG. 12, in step S1210, the first apparatus 1201 according to an embodiment may generate multiplexing information including at least one of HARQ feedback information for DL transmission, UL Positive PSR for UL transmission or SL PSR for SL transmission. In step S1220, the first apparatus 1201 according to an embodiment may transmit the multiplexing information to the base station 1202 through a Physical Uplink Control Channel (PUCCH) in a single slot.

Hereinafter, a rule in which the first apparatus 1201 multiplexes HARQ feedback information for DL transmission, UL PSR, and/or SL PSR, and transmits it through PUCCH will be described in more detail. As an example for convenience of description, it is assumed that N scheduling request resource information and/or scheduling request configuration information for uplink communication of the first apparatus 1201 and K scheduling request resources for performing NR sidelink mode 1 communication and/or scheduling request configuration information is configured. The N and K may be integers greater than or equal to 0. In addition, the rule may be extended to the case where PUCCH transmission of HARQ feedback information for DL transmission, PUCCH transmission of CSI (Channel state information) feedback information related to downlink, PUCCH transmission of UL PSR, and PUCCH transmission of SL PSR overlap in one slot. When PUCCH transmission of HARQ feedback information for DL transmission, PUCCH transmission of CSI feedback information, PUCCH transmission of UL PSR, and PUCCH transmission of SL PSR overlap, the terminal may be configured to transmit DL HARQ, CSI feedback information, UL PSR and SL PSR through PUCCH in one slot, or may mean the case in which the first apparatus would transmit DL HARQ, CSI feedback information, UL PSR and SL PSR through PUCCH in one slot.

According to an embodiment, assuming that the UL PSR has a higher priority than the SL PSR, the first apparatus 1201 may omit transmission of the SL PSR or may not transmit the SL PSR. In this case, the first apparatus 1201 may multiplex an UL PSR and HARQ feedback information for DL transmission and transmit it through PUCCH. In one example, the bit size of the UL PSR may be CEILING (log 2(N+1)) bits, where CEILING (X) is a function that derives the rounding of the value of X.

According to another embodiment, assuming that the SL PSR has a higher priority than the UL PSR, the first apparatus 1201 may omit transmission of the UL PSR or may not transmit the UL PSR. In this case, the first apparatus 1201 may multiplex the SL PSR and HARQ feedback information for DL transmission and transmit it through the PUCCH. In one example, the bit size of the SL PSR may be CEILING (log 2(K+1)) bits.

According to an embodiment, assuming that the UL PSR and the SL PSR have the same priority, the first apparatus 1201 may multiplex HARQ feedback information for UL PSR, SL PSR, and DL transmission and transmit it through the PUCCH. In one example, the bit size of the UL PSR may be CEILING (log 2(N+1)) bits. In one example, the bit size of the SL PSR may be CEILING (log 2(K+1)) bits.

According to an embodiment, the first apparatus 1201 may multiplex HARQ feedback information for UL PSR, SL PSR, and DL transmission, assuming that the SL PSR satisfying a preconfigured condition has the same priority as the UL PSR, and then transmit it through PUCCH. In one example, the bit size of the UL PSR may be CEILING (log 2(N+1)) bits. In one example, the bit size of the SL PSR may be CEILING (log 2(K+1)) bits.

According to another embodiment, assuming that the SL PSR satisfying a preconfigured condition has a higher priority than the UL PSR, the first apparatus 1201 may omit transmission of the UL PSR or may not transmit the UL PSR. At this time, the first apparatus 1201 may multiplex the SL PSR and HARQ feedback information for DL transmission and transmit it through the PUCCH. In one example, the bit size of the SL PSR may be CEILING (log 2(K+1)) bits. The SL PSR satisfying the pre-configured condition may be an SL PSR related to a sidelink service having a latency budget requirement lower than a threshold value, or a sidelink service having a reliability requirement higher than a threshold value, a sidelink service having a higher priority than a threshold, or a preconfigured specific sidelink service. In one example, the first apparatus 1201 may omit transmission of the SL PSR that does not satisfy the preconfigured condition or may not transmit the SL PSR.

In one embodiment, there may be a case in which PUCCH transmission of HARQ feedback information for DL transmission, PUCCH transmission of L (eg, L≤N) UL PSRs, and PUCCH transmission of M (eg, M≤K) SL PSRs overlap in one slot. Alternatively, there may be a case in which the first apparatus 1201 is configured to transmit HARQ feedback information for DL transmission, L UL PSRs, and M SL PSRs through PUCCH in one slot. Alternatively, there may be a case in which the first apparatus 1201 would transmit HARQ feedback information for DL transmission, L UL PSRs, and M SL PSRs through PUCCH in one slot. In this case, in one example, after determining or deriving one UL PSR (FIN_ULPSR) from among L UL PSRs and one SL PSR (FIN_SLPSR) from among M SL PSRs, the multiplexing scheme described above in the above embodiments may be applied to one FIN_ULPSR, one FIN_SLPSR and HARQ feedback information for DL transmission. A method of applying the multiplexing scheme described above in the above embodiments to one FIN_ULPSR, one FIN_SLPSR, and HARQ feedback information for DL transmission may be specifically as follows.

According to an embodiment, assuming that the FIN_ULPSR has a higher priority than the FIN_SLPSR, the first apparatus 1201 may omit transmission of the FIN_SLPSR or may not transmit the FIN_SLPSR. In this case, the first apparatus 1201 may multiplex the FIN_ULPSR and HARQ feedback information for DL transmission and transmit it through the PUCCH. In one example, the bit size of FIN_ULPSR may be CEILING (log 2(N+1)) bits, where CEILING (X) is a function that derives the rounding of the value of X.

According to another embodiment, assuming that FIN_SLPSR has a higher priority than FIN_ULPSR, the first apparatus 1201 may omit transmission of FIN_ULPSR or may not transmit FIN_ULPSR. In this case, the first apparatus 1201 may multiplex the FIN_SLPSR and HARQ feedback information for DL transmission and transmit it through the PUCCH. In one example, the bit size of the SL PSR may be CEILING (log 2(K+1)) bits.

According to an embodiment, assuming that FIN_ULPSR and FIN_SLPSR have the same priority, the first apparatus 1201 may multiplex FIN_ULPSR, FIN_SLPSR, and HARQ feedback information for DL transmission and transmit it through the PUCCH. In one example, the bit size of FIN_ULPSR may be CEILING (log 2(N+1)) bits. In one example, the bit size of FIN_SLPSR may be CEILING (log 2(K+1)) bits.

According to an embodiment, the first apparatus 1201 may multiplex FIN_ULPSR, FIN_SLPSR, and HARQ feedback information for DL transmission, assuming that FIN_SLPSR satisfying a preconfigured condition has the same priority as FIN_ULPSR, and transmit it through PUCCH. In one example, the bit size of FIN_ULPSR may be CEILING (log 2(N+1)) bits. In one example, the bit size of FIN_SLPSR may be CEILING (log 2(K+1)) bits.

According to another embodiment, assuming that FIN_SLPSR satisfying a preconfigured condition has a higher priority than FIN_ULPSR, the first apparatus 1201 may omit transmission of FIN_ULPSR or may not transmit FIN_ULPSR. In this case, the first apparatus 1201 may multiplex the FIN_SLPSR and HARQ feedback information for DL transmission and transmit it through the PUCCH. In one example, the bit size of FIN_SLPSR may be CEILING (log 2(K+1)) bits. The FIN_SLPSR that satisfies the preconfigured condition is an SL PSR related to a sidelink service having a latency budget requirement lower than the threshold value, or a sidelink service having a reliability requirement higher than the threshold value, or a sidelink service having a higher priority than a threshold, or a preconfigured specific sidelink service. In one example, the first apparatus 1201 may omit transmission of the SL PSR that does not satisfy the pre-configured condition or may not transmit the SL PSR.

In this case, the determined or derived FIN_ULPSR is an UL PSR having the highest priority, an UL PSR having the highest or lowest logical channel ID (LCID), or an UL PSR having highest or lowest scheduling request resource/configuration ID, a service-related UL PSR with highest priority, or a service-related UL PSR having tightest requirements (eg, lowest latency, highest reliability, etc.). In this case, the determined or derived one FIN_SLPSR may be an SL PSR having the highest priority, an SL PSR having the highest or lowest logical channel ID (LCID), an SL PSR having the highest or lowest scheduling request resource/configuration ID, a service-related SL PSR with highest priority, or service-related SL PSR having tightest requirements (eg, lowest latency, highest reliability) etc.).

In one embodiment, after determining or deriving Q (Q≤L) RAN_ULPSRs from among L UL PSRs, and determining or deriving W (W≤M) RAN_SLPSRs from among M SL PSRs, the multiplexing scheme described above in the above embodiments may be applied to the Q (or one) RAN_ULPSR, W (or one) RAN_SLPSR, and HARQ feedback information for DL transmission. In one example, one random UL PSR may be determined among the Q RAN_ULPSRs, and one random SL PSR may be determined among the W SL PSRs. In this case, the probabilities that each of the Q RAN_ULPSRs are determined as the random UL PSR may be the same, and the probabilities that each of the W RAN_SLPSRs are determined as the random SL PSR may all be the same. The method of applying the multiplexing scheme described above in the embodiments to at least one of the Q (or one) RAN_ULPSR, the W (or one) RAN_SLPSR, or HARQ feedback information for the DL transmission may be specifically as follows.

According to an embodiment, assuming that the RAN_ULPSR has a higher priority than the RAN_SLPSR, the first apparatus 1201 may omit transmission of the RAN_SLPSR or may not transmit the RAN_SLPSR. In this case, the first apparatus 1201 may multiplex the RAN_ULPSR and HARQ feedback information for DL transmission and transmit it through the PUCCH. In one example, the bit size of RAN_ULPSR may be CEILING (log 2(N+1)) bits. where CEILING (X) is a function that derives the rounding of the value of X.

According to another embodiment, assuming that RAN_SLPSR has a higher priority than RAN_ULPSR, the first apparatus 1201 may omit transmission of RAN_ULPSR or may not transmit RAN_ULPSR. In this case, the first apparatus 1201 may multiplex the RAN_SLPSR and HARQ feedback information for DL transmission and transmit it through the PUCCH. In one example, the bit size of the SL PSR may be CEILING (log 2(K+1)) bits.

According to an embodiment, assuming that RAN_ULPSR and RAN_SLPSR have the same priority, the first apparatus 1201 may multiplex RAN_ULPSR, RAN_SLPSR, and HARQ feedback information for DL transmission and transmit it through PUCCH. In one example, the bit size of FIN_ULPSR may be CEILING (log 2(N+1)) bits. In one example, the bit size of FIN_SLPSR may be CEILING (log 2(K+1)) bits.

According to an embodiment, the first apparatus 1201 multiplexes RAN_ULPSR, RAN_SLPSR and HARQ feedback information for DL transmission, assuming that RAN_SLPSR satisfying a preconfigured condition has the same priority as RAN_ULPSR, and transmits it through PUCCH. In one example, the bit size of RAN_ULPSR may be CEILING (log 2(N+1)) bits. In one example, the bit size of RAN_SLPSR may be CEILING (log 2(K+1)) bits.

According to another embodiment, assuming that RAN_SLPSR satisfying a preconfigured condition has a higher priority than RAN_ULPSR, the first apparatus 1201 may omit transmission of RAN_ULPSR or may not transmit RAN_ULPSR. In this case, the first apparatus 1201 may multiplex the RAN_SLPSR and HARQ feedback information for DL transmission and transmit it through the PUCCH. In one example, the bit size of RAN_SLPSR may be CEILING (log 2(K+1)) bits. The RAN_SLPSR that satisfies the preconfigured condition is a RAN_SLPSR related to a sidelink service having a latency budget requirement lower than the threshold value, or a RAN_SLPSR related to a sidelink service having a reliability requirement higher than the threshold value, or a RAN_SLPSR related to a sidelink service having a higher priority than a threshold value, or a RAN_SLPSR related to a predetermined specific sidelink service. In one example, the first apparatus 1201 may omit transmission of the RAN_SLPSR that does not satisfy the pre-configured condition or may not transmit the RAN_SLPSR.

In this case, the determined or derived Q RAN_ULPSRs may be UL PSRs having a relatively high priority, UL PSRs having a relatively high or relatively low logical channel ID (LCID), or relatively UL PSRs having a high or relatively low scheduling request resource/configuration ID, Q UL PSRs related to Q services having a relatively high priority, or a relatively tight requirement (eg, For example, there may be Q UL PSRs associated with Q services having the lowest latency, highest reliability, etc.). Alternatively, one UL PSR may be randomly determined or selected from among the determined or derived Q RAN_ULPSRs. At this time, the determined or derived W RAN_SLPSRs are SL PSRs having a relatively high priority, SL PSRs having a relatively high or relatively low logical channel ID (LCID), or relatively SL PSRs with high or relatively low scheduling request resource/configuration ID, W SL PSRs related to W services with relatively high priority, or relatively tight requirements (eg For example, there may be W SL PSRs associated with W services having the lowest latency, highest reliability, etc.). Alternatively, one SL PSR may be randomly determined or selected from among the determined or derived W RAN_SLPSRs.

In one embodiment, after determining or deriving one positive scheduling request (FIN_PSR) from among L UL PSRs and M SL PSRs, the above-described multiplexing method in the above embodiments may be applied to the one FIN_PSR and HARQ feedback information for DL transmission. A method of applying the above-described multiplexing scheme in the embodiments to the one FIN_PSR and HARQ feedback information for DL transmission may be specifically as follows.

According to an embodiment, the first apparatus 1201 may multiplex the FIN_PSR that satisfies a preconfigured condition with HARQ feedback information for the DL transmission and transmit it through the PUCCH. In one example, the bit size of FIN_PSR may be CEILING (log 2(N+1)) bits. The FIN_PSR that satisfies the preconfigured condition may be related to a sidelink service having a latency budget requirement lower than a threshold value, or a FIN_PSR related to a sidelink service having a reliability requirement higher than the threshold value, a FIN_PSR related to a sidelink service having a higher priority than a threshold, or a FIN_PSR related to a predetermined specific sidelink service. In one example, the first apparatus 1201 may omit transmission of the FIN_PSR that does not satisfy the preconfigured condition or may not transmit the FIN_PSR.

At this time, the determined or derived one FIN_PSR may be a PSR having the highest priority among the L UL PSRs and the M SL PSRs, a PSR having the highest or highest among the L UL PSRs and the M SL PSRs, a PSR having a low logical channel ID (LCID), a PSR having the highest or lowest scheduling request resource/configuration ID among L UL PSRs and M SL PSRs, a service-related PSR having the highest priority or a service-related PSR having the tightest requirements (eg, lowest latency, highest reliability, etc.).

In one embodiment, after determining or deriving Q (Q≤L, Q≤M, or Q is equal to or less than L+M) RAN_PSRs among L UL PSRs and M SL PSRs, the multiplexing scheme described above in the above embodiments may be applied to Q (or, one) RAN_PSRs and HARQ feedback information for DL transmission. A method of applying the multiplexing scheme described above in the above embodiments to the Q (or one) RAN_PSRs and HARQ feedback information for DL transmission may be specifically as follows. In one example, the Q may be 1 or a preconfigured positive integer of 2 or more.

According to an embodiment, the first apparatus 1201 may multiplex Q (or one) RAN_PSRs satisfying a preconfigured condition with HARQ feedback information for the DL transmission and transmit it through the PUCCH. In one example, the bit size of Q (or one) RAN_PSRs may be CEILING (log 2(N+1)) bits. The Q (or one) RAN_PSRs satisfying the preconfigured condition are PSRs related to sidelink services having a latency budget requirement lower than the threshold value, PSRs having a reliability requirement higher than the threshold value, PSRs related to a sidelink service having a priority higher than a threshold, or PSRs related to a preconfigured specific sidelink service. In one example, the first apparatus 1201 may omit transmission of the PSR that does not satisfy the pre-configured condition or may not transmit the PSR.

In this case, the determined or derived Q RAN_PSRs may be PSRs having a relatively high priority among the L UL PSRs and the M SL PSRs, PSRs having a relatively high or low logical channel ID (LCID) among the L UL PSRs and the M SL PSRs, PSRs having a relatively high or relatively low scheduling request resource/configuration ID among L UL PSRs and M SL PSRs, Q PSRs related to Q services having a relatively high priority among the L UL PSRs and the M SL PSRs, or PSRs related to Q services having a relatively tight requirement (eg, lowest latency, highest reliability, etc) among the L UL PSRs and the M SL PSRs. Alternatively, one PSR may be randomly determined or selected from among the determined or derived Q PSRs.

According to the present disclosure, the base station receiving the SL PSR from the first apparatus 1201 may guarantee an UL grant scheduling timing for sidelink BSR report quickly to the first apparatus 1201 compared to the case of receiving the UL PSR having a relatively non-tight service requirement (eg, latency budget).

Figure 13:
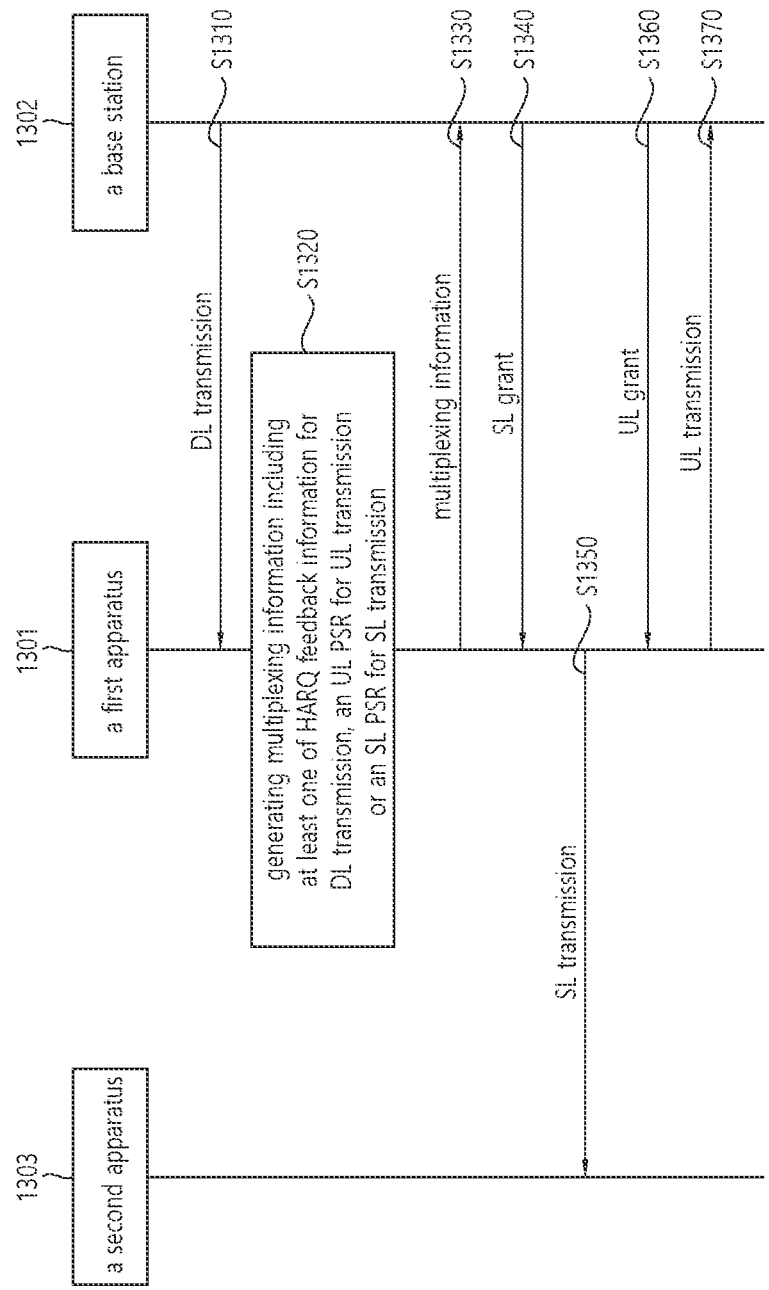
FIG. 13 shows a communication method between a first apparatus, a base station and a second apparatus according to an embodiment of the present disclosure.

FIG. 13 shows a communication method between a first apparatus, a base station and a second apparatus according to an embodiment of the present disclosure.

In FIG. 13, a description of the content overlapping with the content described in FIG. 12 will be omitted. For example, since S1320 may correspond to S1210 of FIG. 12 and S1330 may correspond to S1220 of FIG. 12, the contents described above in FIG. 12 will not be repeated in FIG. 13.

In addition, since FIG. 13 only corresponds to an embodiment related to FIG. 12, it should not be construed as limiting the scope of rights of the embodiments according to FIG. 12 due to FIG. 13. For example, steps S1310, S1340, S1350, S1360, and S1370 shown in FIG. 13 may not be essential steps, and some or all steps may be omitted. In addition, those skilled in the art will readily understand that the operation order of each of S1310 to S1370 may not be fixed and may vary from that shown in FIG. 13.

In step S1310, the base station 1302 according to an embodiment may perform DL transmission to the first apparatus 1301.

In step S1320, the first apparatus 1301 according to an embodiment may generate multiplexing information including at least one of HARQ feedback information for the DL transmission, a UL PSR for UL transmission, or an SL PSR for SL transmission.

In step S1330, the first apparatus 1301 according to an embodiment may transmit the multiplexing information to the base station 1302. In one example, the first apparatus 1301 may transmit the multiplexing information through a PUCCH in a single slot.

In step S1340, the first apparatus 1301 according to an embodiment may receive an SL grant from the base station 1302. In one example, the first apparatus 1301 may receive an SL grant related to the SL PSR from the base station 1302. In one example, the first apparatus 1301 may determine an SL resource for performing SL transmission based on the SL grant.

In operation S1350, the first apparatus 1301 according to an embodiment may perform SL transmission to the second device 1303. In one example, the first apparatus 1301 may perform SL transmission to the second apparatus 1303 on the SL resource determined based on the SL grant.

In step S1360, the first apparatus 1301 according to an embodiment may receive a UL grant from the base station 1302. In one example, the first apparatus 1301 may receive an UL grant associated with the UL PSR from the base station 1302. In one example, the first apparatus 1301 may determine an UL resource for performing UL transmission based on the UL grant.

In step S1370, the first apparatus 1301 according to an embodiment may perform UL transmission to the second apparatus 1303. In one example, the first apparatus 1301 may perform UL transmission to the second apparatus 1303 on the UL resource determined based on the UL grant.

Figure 14:
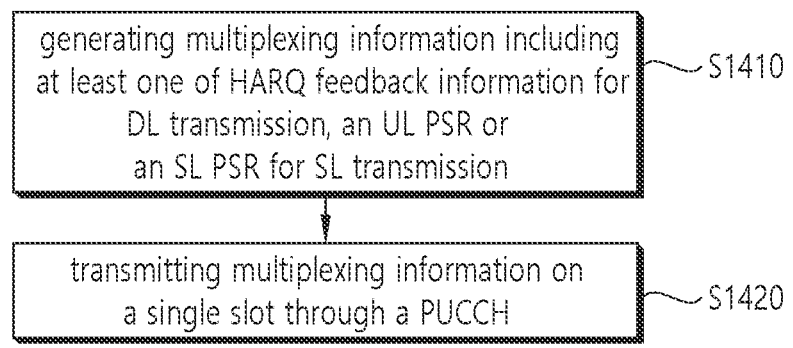
FIG. 14 shows an operation of a first apparatus according to an embodiment of the present disclosure.

FIG. 14 shows an operation of a first apparatus according to an embodiment of the present disclosure.

Operations disclosed in the flowchart of FIG. 14 may be performed in combination with various embodiments of the present disclosure. In one example, the operations disclosed in the flowchart of FIG. 14 may be performed based on at least one of the devices illustrated in FIG. 16 to FIG. 21.

In step S1410, the first apparatus according to an embodiment may generate multiplexing information including at least one of hybrid automatic repeat request (HARQ) feedback information for downlink (DL) transmission, an uplink (UL) positive scheduling request (PSR) for UL transmission or a sidelink (SL) PSR for SL transmission.

In step S1420, the first apparatus according to an embodiment may transmit the multiplexing information in a single slot to the base station through the PUCCH.

In an embodiment, the multiplexing information may further include channel state information (CSI) feedback information for the DL transmission.

In an embodiment, the multiplexing information may be composed of the UL PSR and the HARQ feedback information based on that a priority of the UL PSR is higher than a priority of the SL PSR, and the multiplexing information may be composed of the SL PSR and the HARQ feedback information based on that a priority of the SL PSR is higher than a priority of the UL PSR.

In an embodiment, the multiplexing information may be composed of the UL PSR, the SL PSR and the HARQ feedback information based on that a priority of the UP PSR is equal to a priority of the SL PSR.

In an embodiment the multiplexing information may be composed of the UL PSR, the SL PSR and the HARQ feedback information based on that the SL PSR satisfies a preconfigured condition and a priority of the SL PSR is equal to a priority of the UL PSR.

In an embodiment, the preconfigured condition may include at least one of a condition in which the SL PSR is related to an SL service having a latency budget requirement lower than a threshold, a condition in which the SL PSR is related to an SL service having a reliability requirement higher than a threshold, a condition in which the SL PSR is related to an SL service having a priority higher than a threshold or a condition in which the SL PSR is related to a specific SL service.

In an embodiment, the multiplexing information may be composed of the SL PSR and the HARQ feedback information based on that the SL PSR satisfies a pre-configured condition and a priority of the SL PSR is higher than a priority of the UL PSR.

In an embodiment, the UL PSR may have a highest priority among L UL PSRs related to the single slot, have a highest logical channel ID (LCID), have a lowest LCID, have a highest scheduling request configuration ID, have a lowest scheduling request configuration ID, be related to a service having a lowest latency requirement or be related to a service having a highest reliability requirement. The SL PSR may have a highest priority among M SL PSRs related to the single slot, have a highest LCID, has a lowest LCDI, have a highest scheduling request configuration ID, have a lowest scheduling request configuration ID, be related to a service having a lowest latency requirement or be related to a service having a highest reliability requirement. Where, the L and the M may be positive integers.

In an embodiment, the generating the multiplexing information includes: determining Q UL PSRs among L UL PSRs related to the single slot, determining W SL PSRs among M SL PSRs related to the single slot and generating the multiplexing information based on the Q UL PSRs and the W SL PSRs. Where, the Q UL PSRs may have relatively high priorities among the L UL PSRs, have relatively high LCIDs, have relatively low LCIDs, have relatively high scheduling request configuration IDs, have relatively low scheduling request configuration IDs, be related to Q services having relatively high priorities, be related to Q services having relatively low latency requirement, or be related to Q services having relatively high reliability requirement. The W SL PSRs may have relatively high priorities among the M UL PSRs, have relatively high LCIDs, have relatively low LCIDs, have relatively high scheduling request configuration IDs, have relatively low scheduling request configuration IDs, be related to W services having relatively high priorities, be related to W services having relatively low latency requirement, or be related to W services having relatively high reliability requirement. Where, the L, the Q, the M and the W may be positive integers, the L may be equal to or bigger than the Q, and the M may be equal to or bigger than the W.

In an embodiment, the generating the multiplexing information based on the Q UL PSRs and the W SL PSRs may include: determining a random UL PSR among the Q UL PSRs, determining a random SL PSR among the W SL PSRs and generating the multiplexing information based on the random UL PSR and the random SL PSR. Probabilities that each of the Q UL PSRs are determined as the random UL PSR may be all same, and probabilities that each of the W SL PSRs are determined as the random SL PSR may be all same, and the random UL PSR is the UL PSR, and the random SL PSR may be the SL PSR. In an example, probabilities that each of the Q UL PSRs are determined as the random UL PSR may be all same as 1/Q, and probabilities that each of the w sL PSRs are determined as the random sL PSR may be all same as 1/W.

In an embodiment, the generating the multiplexing information may include: determining Q PSRs among L UL PSRs and M SL PSRs related to the single slot and generating the multiplexing information based on the Q PSRs, the Q PSRs have relatively high priorities among the L UL PSRs and the M SL PSRs, have relatively high LCIDs, have relatively low LCIDs, have relatively high scheduling request configuration IDs, have relatively low scheduling request configuration IDs, are related to Q services having relatively high priorities, are related to Q services having relatively low latency requirement, or are related to Q services having relatively high reliability requirement. Where, the L, the M and the Q may be positive integers. In an example, the Q may be equal to or smaller than the L, and the Q may be equal to or smaller than the M. In another example, the Q may be equal to or less than L+M.

In an embodiment, the Q may be 1 or preconfigured 2 or more positive integer.

In an embodiment, the generating the multiplexing information may include: determining the UL PSR having a highest priority among L UL PSRs related to the single slot, determining the SL PSR having a highest priority among M SL PSRs related to the single slot and generating the multiplexing information based on a comparison between a priority of the UL PSR and a priority of the SL PSR, the multiplexing information may be composed of the M SL PSRs and the HARQ feedback information based on that a priority of the SL PSR is greater than a priority of the UL PSR, and the L and the M may be positive integers.

According to an embodiment of the present disclosure, a first apparatus for transmitting a physical uplink control channel (PUCCH) to a base station is provided. The first apparatus includes at least one memory to store instructions, at least one transceiver, and at least one processor to connect the at least one memory and the at least one transceiver, wherein the at least one processor is configured to: generate multiplexing information including at least one of hybrid automatic repeat request (HARQ) feedback information for downlink (DL) transmission, an uplink (UL) positive scheduling request (PSR) for UL transmission or a sidelink (SL) PSR for SL transmission, and control the at least one transceiver to transmit the multiplexing information in a single slot to the base station through the PUCCH.

According to an embodiment of the present disclosure, an apparatus (or chip(set)) for controlling a first terminal is provided. The apparatus includes at least one processor and at least one computer memory that is connected to be executable by the at least one processor and stores instructions, wherein, when the at least one processor executes the instructions, the first terminal is configured to: generate multiplexing information including at least one of hybrid automatic repeat request (HARQ) feedback information for downlink (DL) transmission, an uplink (UL) positive scheduling request (PSR) for UL transmission or a sidelink (SL) PSR for SL transmission, and transmit the multiplexing information in a single slot to a base station through the PUCCH.

In one example, the first terminal of the embodiment may indicate the first apparatus described throughout the present disclosure. In one example, each of the at least one processor, the at least one memory, and the like in the apparatus for controlling the first terminal may be configured as a separate sub-chip, or at least two components thereof may be configured through a single sub-chip.

According to the other embodiment of the present disclosure, a non-transitory computer-readable storage medium that stores instructions (or indications) is provided. When executed by at least one processor of the non-transitory computer-readable storage medium: multiplexing information including at least one of hybrid automatic repeat request (HARQ) feedback information for downlink (DL) transmission, an uplink (UL) positive scheduling request (PSR) for UL transmission or a sidelink (SL) PSR for SL transmission is generated by a first apparatus, and the multiplexing information in a single slot is transmitted to a base station through the PUCCH by the first apparatus.

FIG. 15 shows an operation of a base station according to an embodiment of the present disclosure.

Operations disclosed in the flowchart of FIG. 15 may be performed in combination with various embodiments of the present disclosure. In one example, the operations disclosed in the flowchart of FIG. 15 may be performed based on at least one of the devices illustrated in FIG. 16 to FIG. 21.

In step S1510, the base station according to an embodiment may receive multiplexing information generated in the first apparatus from the first apparatus through the PUCCH on a single slot.

In an embodiment, the multiplexing information may include at least one of HARQ feedback information for DL transmission, an UL PSR for UL transmission or an SL PSR for SL transmission.

In an embodiment, the multiplexing information may further include channel state information (CSI) feedback information for the DL transmission.

In an embodiment, the multiplexing information may be composed of the UL PSR and the HARQ feedback information based on that a priority of the UL PSR is higher than a priority of the SL PSR, and the multiplexing information may be composed of the SL PSR and the HARQ feedback information based on that a priority of the SL PSR is higher than a priority of the UL PSR.

In an embodiment, the multiplexing information may be composed of the UL PSR, the SL PSR and the HARQ feedback information based on that a priority of the UP PSR is equal to a priority of the SL PSR.

In an embodiment the multiplexing information may be composed of the UL PSR, the SL PSR and the HARQ feedback information based on that the SL PSR satisfies a preconfigured condition and a priority of the SL PSR is equal to a priority of the UL PSR.

In an embodiment, the preconfigured condition may include at least one of a condition in which the SL PSR is related to an SL service having a latency budget requirement lower than a threshold, a condition in which the SL PSR is related to an SL service having a reliability requirement higher than a threshold, a condition in which the SL PSR is related to an SL service having a priority higher than a threshold or a condition in which the SL PSR is related to a specific SL service.

In an embodiment, the multiplexing information may be composed of the SL PSR and the HARQ feedback information based on that the SL PSR satisfies a pre-configured condition and a priority of the SL PSR is higher than a priority of the UL PSR.

In an embodiment, the UL PSR may have a highest priority among L UL PSRs related to the single slot, have a highest logical channel ID (LCID), have a lowest LCID, have a highest scheduling request configuration ID, have a lowest scheduling request configuration ID, be related to a service having a lowest latency requirement or be related to a service having a highest reliability requirement. The SL PSR may have a highest priority among M SL PSRs related to the single slot, have a highest LCID, has a lowest LCDI, have a highest scheduling request configuration ID, have a lowest scheduling request configuration ID, be related to a service having a lowest latency requirement or be related to a service having a highest reliability requirement. Where, the L and the M may be positive integers.

In an embodiment, the generating the multiplexing information includes: determining Q UL PSRs among L UL PSRs related to the single slot, determining W SL PSRs among M SL PSRs related to the single slot and generating the multiplexing information based on the Q UL PSRs and the W SL PSRs. Where, the Q UL PSRs may have relatively high priorities among the L UL PSRs, have relatively high LCIDs, have relatively low LCIDs, have relatively high scheduling request configuration IDs, have relatively low scheduling request configuration IDs, be related to Q services having relatively high priorities, be related to Q services having relatively low latency requirement, or be related to Q services having relatively high reliability requirement. The W SL PSRs may have relatively high priorities among the M UL PSRs, have relatively high LCIDs, have relatively low LCIDs, have relatively high scheduling request configuration IDs, have relatively low scheduling request configuration IDs, be related to W services having relatively high priorities, be related to W services having relatively low latency requirement, or be related to W services having relatively high reliability requirement. Where, the L, the Q, the M and the W may be positive integers, the L may be equal to or bigger than the Q, and the M may be equal to or bigger than the W.

In an embodiment, the generating the multiplexing information based on the Q UL PSRs and the W SL PSRs may include: determining a random UL PSR among the Q UL PSRs, determining a random SL PSR among the W SL PSRs and generating the multiplexing information based on the random UL PSR and the random SL PSR. Probabilities that each of the Q UL PSRs are determined as the random UL PSR may be all same, and probabilities that each of the W SL PSRs are determined as the random SL PSR may be all same, and the random UL PSR is the UL PSR, and the random SL PSR may be the SL PSR.

In an embodiment, the generating the multiplexing information may include: determining Q PSRs among L UL PSRs and M SL PSRs related to the single slot and generating the multiplexing information based on the Q PSRs, the Q PSRs have relatively high priorities among the L UL PSRs and the M SL PSRs, have relatively high LCIDs, have relatively low LCIDs, have relatively high scheduling request configuration IDs, have relatively low scheduling request configuration IDs, are related to Q services having relatively high priorities, are related to Q services having relatively low latency requirement, or are related to Q services having relatively high reliability requirement. Where, the L, the M and the Q may be positive integers. In an example, the Q may be equal to or smaller than the L, and the Q may be equal to or smaller than the M. In another example, the Q may be equal to or less than L+M.

In an embodiment, the Q may be 1 or preconfigured 2 or more positive integer.

In an embodiment, the generating the multiplexing information may include: determining the UL PSR having a highest priority among L UL PSRs related to the single slot, determining the SL PSR having a highest priority among M SL PSRs related to the single slot and generating the multiplexing information based on a comparison between a priority of the UL PSR and a priority of the SL PSR, the multiplexing information may be composed of the M SL PSRs and the HARQ feedback information based on that a priority of the SL PSR is greater than a priority of the UL PSR, and the L and the M may be positive integers.

According to the other embodiment of the present disclosure, a base station for receiving a PUCCH from a first apparatus is provided. The base station includes at least one memory to store instructions, at least one transceiver, and at least one processor to connect the at least one memory and the at least one transceiver, wherein the at least one processor is configured to: receive multiplexing information generated in the first apparatus from the first apparatus through the PUCCH on a single slot, wherein the multiplexing information includes at least one of HARQ feedback information for DL transmission, an UL PSR for UL transmission or an SL PSR for SL transmission.

Various embodiments of the present disclosure may be independently implemented. Alternatively, the various embodiments of the present disclosure may be implemented by being combined or merged. For example, although the various embodiments of the present disclosure have been described based on the 3GPP LTE system for convenience of explanation, the various embodiments of the present disclosure may also be extendedly applied to another system other than the 3GPP LTE system. For example, the various embodiments of the present disclosure may also be used in an uplink or downlink case without being limited only to direct communication between terminals. In this case, a base station, a relay node, or the like may use the proposed method according to various embodiments of the present disclosure. For example, it may be defined that information on whether to apply the method according to various embodiments of the present disclosure is reported by the base station to the terminal or by a transmitting terminal to a receiving terminal through pre-defined signaling (e.g., physical layer signaling or higher layer signaling). For example, it may be defined that information on a rule according to various embodiments of the present disclosure is reported by the base station to the terminal or by a transmitting terminal to a receiving terminal through pre-defined signaling (e.g., physical layer signaling or higher layer signaling). For example, some embodiments among various embodiments of the present disclosure may be applied limitedly only to a resource allocation mode 1. For example, some embodiments among various embodiments of the present disclosure may be applied limitedly only to a resource allocation mode 2.

Hereinafter, an apparatus to which various embodiments of the present disclosure can be applied will be described.

The various descriptions, functions, procedures, proposals, methods, and/or operational flowcharts of the present disclosure described in this document may be applied to, without being limited to, a variety of fields requiring wireless communication/connection (e.g., 5G) between devices.

Hereinafter, a description will be given in more detail with reference to the drawings. In the following drawings/description, the same reference symbols may denote the same or corresponding hardware blocks, software blocks, or functional blocks unless described otherwise.

Figure 16:
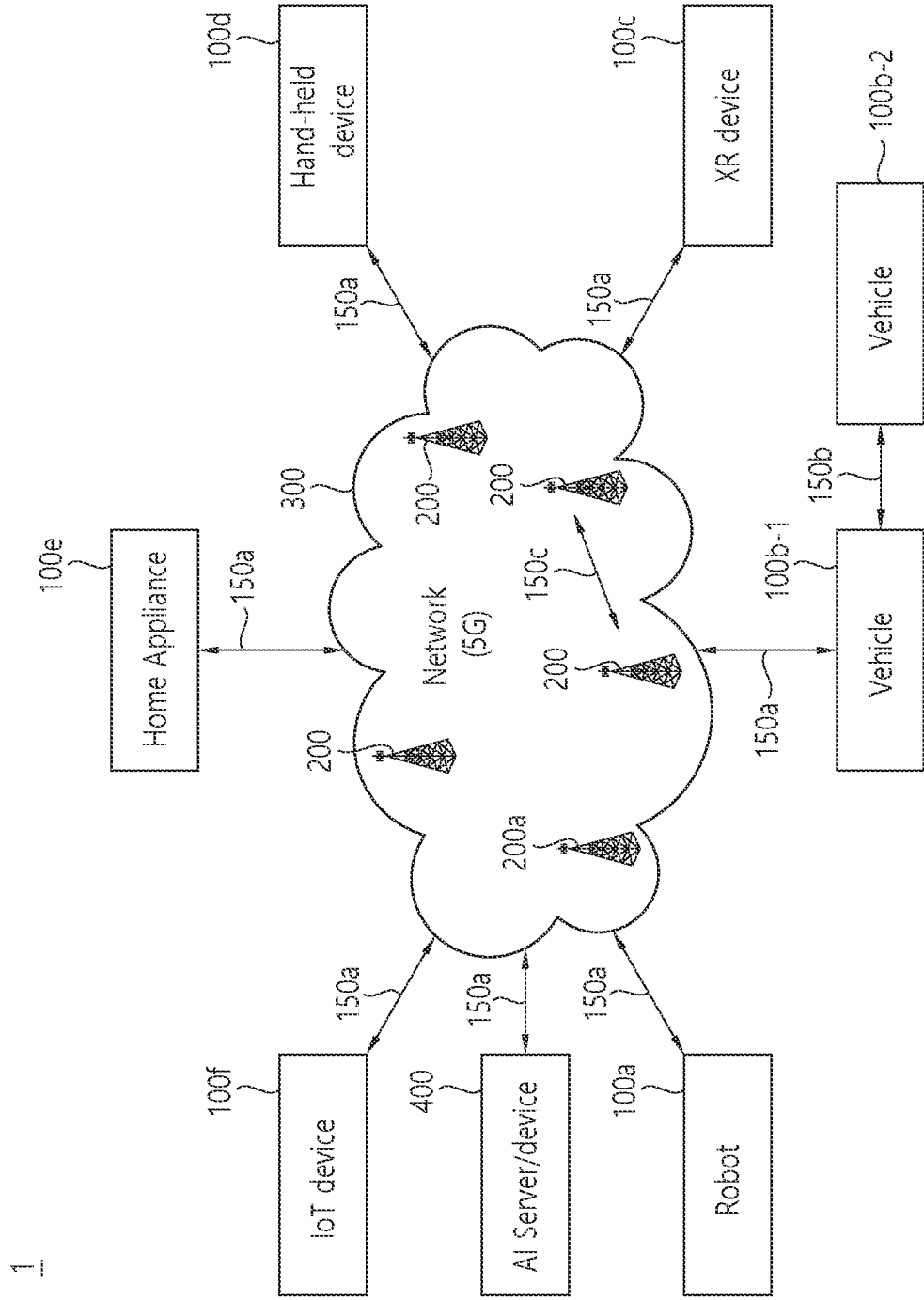
FIG. 16 shows a communication system 1 in accordance with an embodiment of the present disclosure.

FIG. 16 shows a communication system 1 in accordance with an embodiment of the present disclosure.

Referring to FIG. 16, a communication system 1 to which various embodiments of the present disclosure are applied includes wireless devices, Base Stations (BSs), and a network. Herein, the wireless devices represent devices performing communication using radio access technology (RAT) (e.g., 5G new rat (NR)) or long-term evolution (LTE)) and may be referred to as communication/radio/5G devices. The wireless devices may include, without being limited to, a robot 100a, vehicles 100b-1 and 100b-2, an extended reality (XR) device 100c, a hand-held device 100d, a home appliance 100e, an Internet of things (IoT) device 100f, and an Artificial Intelligence (AI) device/server 400. For example, the vehicles may include a vehicle having a wireless communication function, an autonomous vehicle, and a vehicle capable of performing communication between vehicles. Herein, the vehicles may include an unmanned aerial vehicle (UAV) (e.g., a drone). The XR device may include an augmented reality (AR)/virtual reality (VR)/Mixed Reality (MR) device and may be implemented in the form of a head-mounted device (HMD), a head-up display (HUD) mounted in a vehicle, a television, a smartphone, a computer, a wearable device, a home appliance device, a digital signage, a vehicle, a robot, or the like. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200a may operate as a BS/network node with respect to other wireless devices.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without passing through the BSs/network. For example, the vehicles 100b-1 and 100b-2 may perform direct communication (e.g., vehicle-to-vehicle (V2V)/vehicle-to-everything (V2X) communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f/BS 200, or BS 200/BS 200. Herein, the wireless communication/connections may be established through various RATs (e.g., 5G NR) such as uplink/downlink communication 150a, sidelink communication 150b (or, D2D communication), or inter BS communication (e.g., relay, Integrated Access Backhaul (IAB)). The wireless devices and the BSs/the wireless devices may transmit/receive radio signals to/from each other through the wireless communication/connections 150*a* and 150*b*. For example, the wireless communication/connections 150*a* and 150*b* may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Figure 17:
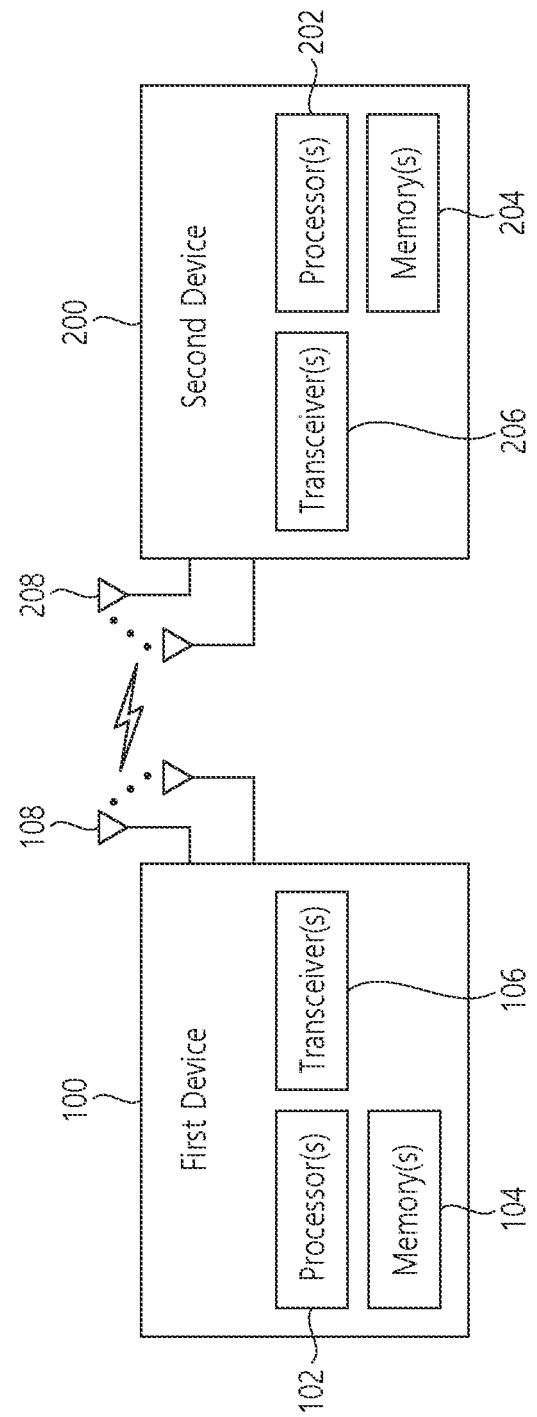
FIG. 17 shows wireless devices in accordance with an embodiment of the present disclosure.

FIG. 17 shows wireless devices in accordance with an embodiment of the present disclosure.

Referring to FIG. 17, a first wireless device 100 and a second wireless device 200 may transmit radio signals through a variety of RATs (e.g., LTE and NR). Herein, {the first wireless device 100 and the second wireless device 200} may correspond to {the wireless device 100*x* and the BS 200} and/or {the wireless device 100*x* and the wireless device 100*x*} of FIG. 16.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more protocol data units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more application-specific integrated Circuits (ASICs), one or more digital signal processors (DSPs), one or more digital signal processing devices (DSPDs), one or more programmable logic devices (PLDs), or one or more field programmable gate arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by read-only memories (ROMs), random access memories (RAMs), electrically erasable programmable read-only memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other apparatuses. The one or more transceivers 106 and 206 may receive user data, control information, and/or radio signals/channels, mentioned in the descriptions, functions, procedures, proposals, methods, and/or operational flowcharts disclosed in this document, from one or more other apparatuses. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other apparatuses. In addition, the one or more processors 102 and 202 may perform control so that the one or more transceivers 106 and 206 may receive user data, control information, or radio signals from one or more other apparatuses. In addition, the one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels or the like from RF band signals into baseband signals in order to process received user data, control information, radio signals/channels, or the like using the one or more processors 102 and 202. The one or more transceivers 106 and 206 may convert the user data, control information, radio signals/channels, or the like processed using the one or more processors 102 and 202 from the base band signals into the RF band signals. To this end, the one or more transceivers 106 and 206 may include (analog) oscillators and/or filters.

Figure 18:
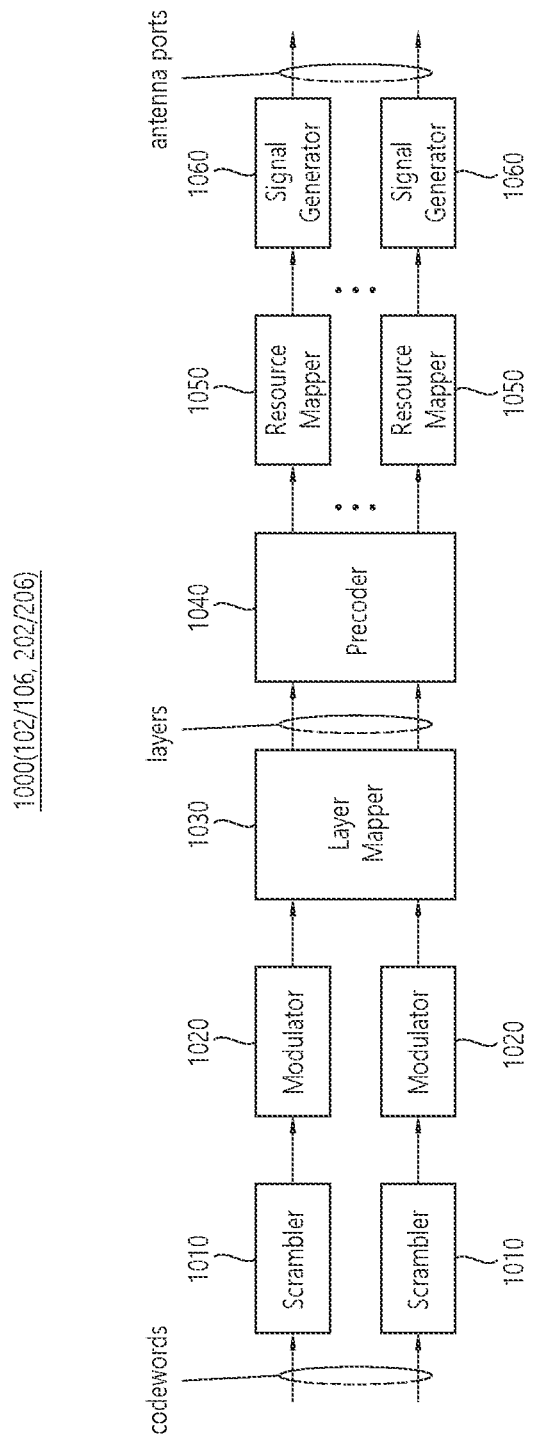
FIG. 18 shows a signal process circuit for a transmission signal in accordance with an embodiment of the present disclosure.

FIG. 18 shows a signal process circuit for a transmission signal in accordance with an embodiment of the present disclosure.

Referring to FIG. 18, a signal processing circuit 1000 may include scramblers 1010, modulators 1020, a layer mapper 1030, a precoder 1040, resource mappers 1050, and signal generators 1060. An operation/function of FIG. 18 may be performed by, without being limited to, the processors 102 and 202 and/or the transceivers 106 and 206 of FIG. 17. Hardware elements of FIG. 18 may be implemented by the processors 102 and 202 and/or the transceivers 106 and 206 of FIG. 17. For example, blocks 1010 to 1060 may be implemented by the processors 102 and 202 of FIG. 17. Alternatively, the blocks 1010 to 1050 may be implemented by the processors 102 and 202 of FIG. 17 and the block 1060 may be implemented by the transceivers 106 and 206 of FIG. 17.

Codewords may be converted into radio signals via the signal processing circuit 1000 of FIG. 18. Herein, the codewords are encoded bit sequences of information blocks. The information blocks may include transport blocks (e.g., a UL-SCH transport block, a DL-SCH transport block). The radio signals may be transmitted through various physical channels (e.g., a PUSCH and a PDSCH).

Specifically, the codewords may be converted into scrambled bit sequences by the scramblers 1010. Scramble sequences used for scrambling may be generated based on an initialization value, and the initialization value may include ID information of a wireless device. The scrambled bit sequences may be modulated to modulation symbol sequences by the modulators 1020. A modulation scheme may include pi/2-binary phase shift keying (pi/2-BPSK), m-phase shift keying (m-PSK), and m-quadrature amplitude modulation (m-QAM). Complex modulation symbol sequences may be mapped to one or more transport layers by the layer mapper 1030. Modulation symbols of each transport layer may be mapped (precoded) to corresponding antenna port(s) by the precoder 1040. Outputs z of the precoder 1040 may be obtained by multiplying outputs y of the layer mapper 1030 by an N*M precoding matrix W. Herein, N is the number of antenna ports and M is the number of transport layers. The precoder 1040 may perform precoding after performing transform precoding (e.g., DFT) for complex modulation symbols. Alternatively, the precoder 1040 may perform precoding without performing transform precoding.

The resource mappers 1050 may map modulation symbols of each antenna port to time-frequency resources. The time-frequency resources may include a plurality of symbols (e.g., a CP-OFDMA symbols and DFT-s-OFDMA symbols) in the time domain and a plurality of subcarriers in the frequency domain. The signal generators 1060 may generate radio signals from the mapped modulation symbols and the generated radio signals may be transmitted to other devices through each antenna. For this purpose, the signal generators 1060 may include inverse fast Fourier transform (IFFT) modules, cyclic prefix (CP) inserters, digital-to-analog converters (DACs), and frequency up-converters.

Signal processing procedures for a signal received in the wireless device may be configured in a reverse manner of the signal processing procedures 1010 to 1060 of FIG. 18. For example, the wireless devices (e.g., 100 and 200 of FIG. 17) may receive radio signals from the exterior through the antenna ports/transceivers. The received radio signals may be converted into baseband signals through signal restorers. To this end, the signal restorers may include frequency downlink converters, analog-to-digital converters (ADCs), CP remover, and fast Fourier transform (FFT) modules. Next, the baseband signals may be restored to codewords through a resource demapping procedure, a postcoding procedure, a demodulation processor, and a descrambling procedure. The codewords may be restored to original information blocks through decoding. Therefore, a signal processing circuit (not illustrated) for a reception signal may include signal restorers, resource demappers, a postcoder, demodulators, descramblers, and decoders.

Figure 19:
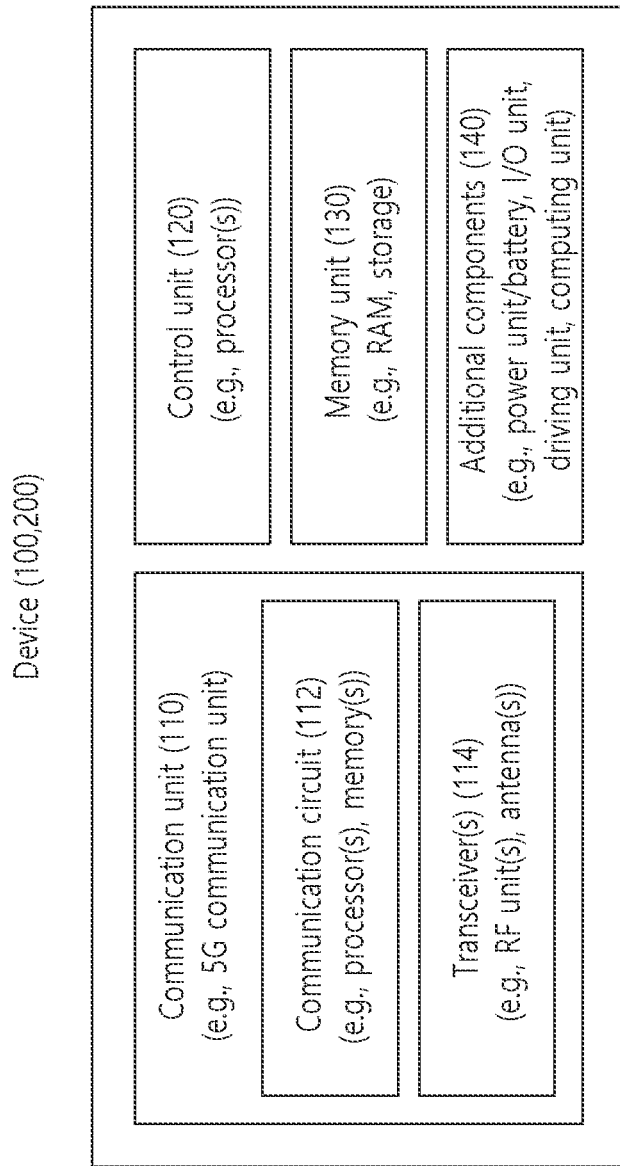
FIG. 19 shows a wireless device in accordance with an embodiment of the present disclosure.

FIG. 19 shows a wireless device in accordance with an embodiment of the present disclosure. The wireless device may be implemented in various forms according to a use-case/service (see FIG. 16).

Referring to FIG. 19, wireless devices 100 and 200 may correspond to the wireless devices 100 and 200 of FIG. 17 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 17. For example, the transceiver(s) 114 may include the one or more transceivers 106 and 206 and/or the one or more antennas 108 and 208 of FIG. 17. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. In addition, the control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100a of FIG. 16), the vehicles (100b-1 and 100b-2 of FIG. 16), the XR device (100c of FIG. 16), the hand-held device (100d of FIG. 16), the home appliance (100e of FIG. 16), the IoT device (100f of FIG. 16), a digital broadcast terminal, a hologram device, a public safety device, an MTC device, a medicine device, a fintech device (or a finance device), a security device, a climate/environment device, the AI server/device (400 of FIG. 16), the BSs (200 of FIG. 16), a network node, or the like. The wireless device may be used in a mobile or fixed place according to a use-example/service.

In FIG. 19, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an electronic control unit (ECU), a graphical processing unit, and a memory control processor. As another example, the memory 130 may be configured by a random access memory (RAM), a dynamic RAM (DRAM), a read-only memory (ROM)), a flash memory, a volatile memory, a non-volatile memory, and/or a combination thereof.

Hereinafter, an example of implementing FIG. 19 will be described in detail with reference to the drawings.

Figure 20:
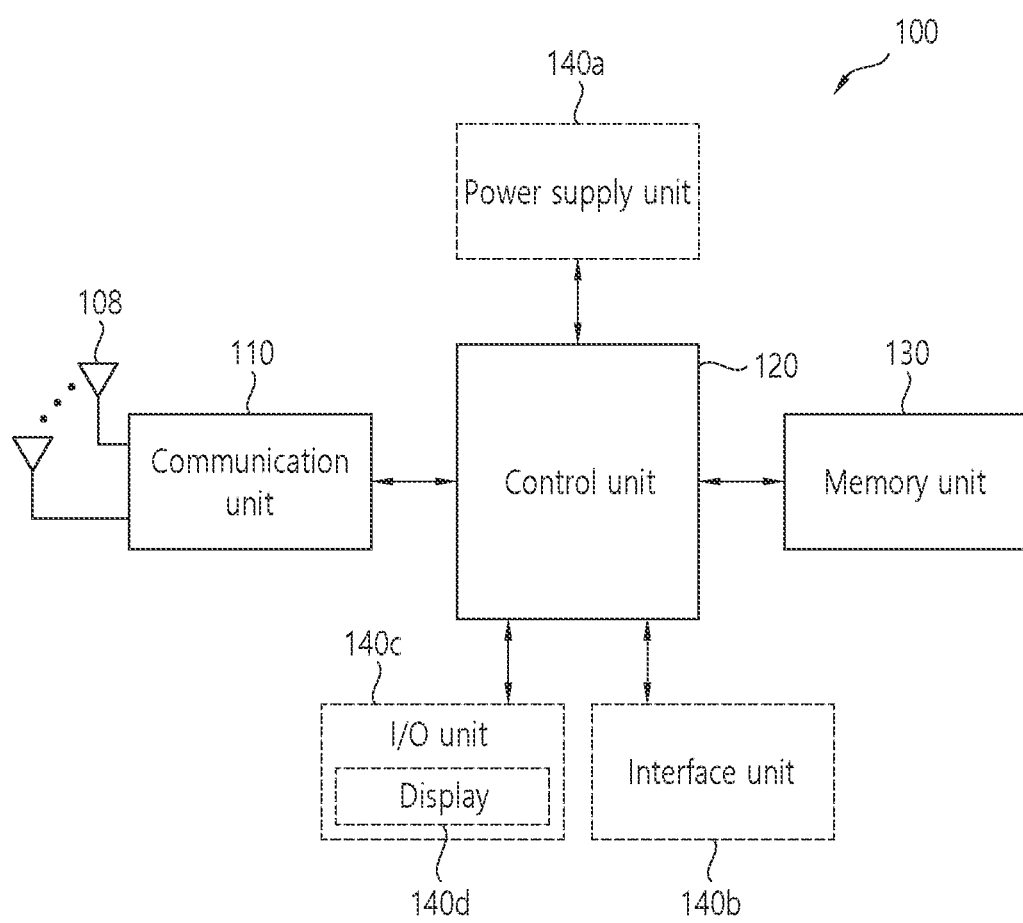
FIG. 20 shows a hand-held device in accordance with an embodiment of the present disclosure.

FIG. 20 shows a hand-held device in accordance with an embodiment of the present disclosure. The hand-held device may include a smartphone, a smartpad, a wearable device (e.g., a smartwatch or a smartglasses), or a portable computer (e.g., a notebook). The hand-held device may be referred to as a Mobile Station (MS), a User Terminal (UT), a Mobile Subscriber Station (MSS), a Subscriber Station (SS), an Advanced Mobile Station (AMS), or a Wireless Terminal (WT).

Referring to FIG. 20, a hand-held device 100 may include an antenna unit 108, a communication unit 110, a control unit 120, a memory unit 130, a power supply unit 140a, an interface unit 140b, and an I/O unit 140c. The antenna unit 108 may be configured as a part of the communication unit 110. Blocks 110 to 130/140a to 140c correspond to the blocks 110 to 130/140 of FIG. X3, respectively.

The communication unit 110 may transmit and receive signals (e.g., data and control signals) to and from other wireless devices or BSs. The control unit 120 may perform various operations by controlling constituent elements of the hand-held device 100. The control unit 120 may include an application processor (AP). The memory unit 130 may store data/parameters/programs/code/commands needed to drive the hand-held device 100. In addition, the memory unit 130 may store input/output data/information. The power supply unit 140a may supply power to the hand-held device 100 and include a wired/wireless charging circuit, a battery, or the like. The interface unit 140b may support connection of the hand-held device 100 to other external devices. The interface unit 140b may include various ports (e.g., an audio I/O port and a video I/O port) for connection with external devices. The I/O unit 140c may input or output video information/signals, audio information/signals, data, and/or information input by a user. The I/O unit 140c may include a camera, a microphone, a user input unit, a display unit 140d, a speaker, and/or a haptic module.

As an example, in the case of data communication, the I/O unit 140c may acquire information/signals (e.g., touch, text, voice, images, or video) input by a user and the acquired information/signals may be stored in the memory unit 130. The communication unit 110 may convert the information/signals stored in the memory into radio signals and transmit the converted radio signals to other wireless devices directly or to a BS. The communication unit 110 may receive radio signals from other wireless devices or the BS and then restore the received radio signals into original information/signals. The restored information/signals may be stored in the memory unit 130 and may be output as various types (e.g., text, voice, images, video, or haptic) through the I/O unit 140c.

Figure 21:
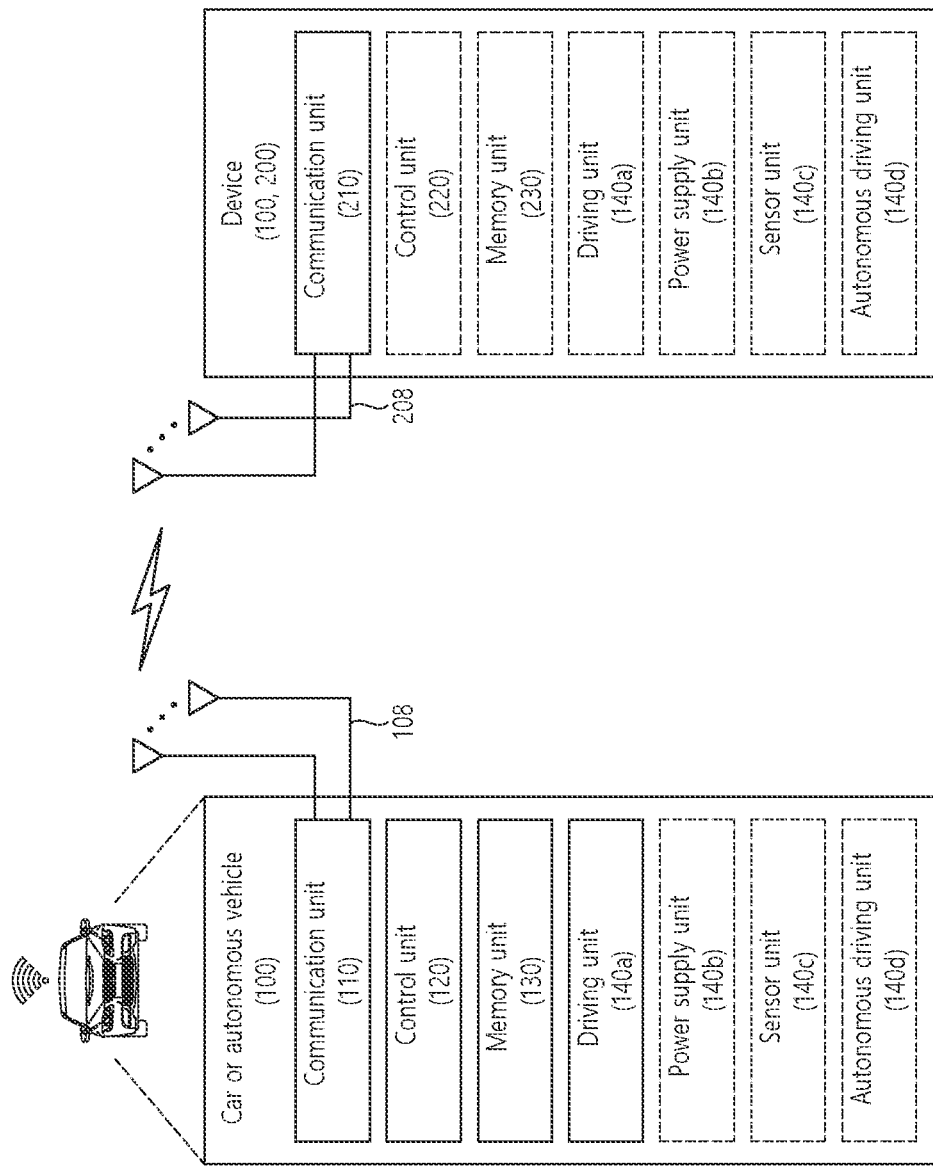
FIG. 21 shows a car or an autonomous vehicle in accordance with an embodiment of the present disclosure.

FIG. 21 shows a car or an autonomous vehicle in accordance with an embodiment of the present disclosure. The car or autonomous vehicle may be implemented by a mobile robot, a car, a train, a manned/unmanned aerial vehicle (AV), a ship, or the like Referring to FIG. 21, a car or autonomous vehicle 100 may include an antenna unit 108, a communication unit 110, a control unit 120, a driving unit 140a, a power supply unit 140b, a sensor unit 140c, and an autonomous driving unit 140d. The antenna unit 108 may be configured as a part of the communication unit 110. The blocks 110/130/140a to 140d correspond to the blocks 110/130/140 of FIG. 19, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous vehicle 100. The control unit 120 may include an electronic control unit (ECU). The driving unit 140a may cause the vehicle or the autonomous vehicle 100 to drive on a road. The driving unit 140a may include an engine, a motor, a powertrain, a wheel, a brake, a steering device, or the like. The power supply unit 140b may supply power to the vehicle or the autonomous vehicle 100 and include a wired/wireless charging circuit, a battery, or the like. The sensor unit 140c may acquire a vehicle state, ambient environment information, user information, or the like. The sensor unit 140c may include an inertial measurement unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, or the like. The autonomous driving unit 140d may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, or the like from an external server. The autonomous driving unit 140d may generate an autonomous driving path and a driving plan from the obtained data. The control unit 120 may control the driving unit 140a such that the vehicle or the autonomous vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In addition, in the middle of autonomous driving, the sensor unit 140c may obtain a vehicle state and/or surrounding environment information. The autonomous driving unit 140d may update the autonomous driving path and the driving plan based on the newly obtained data/information. The communication unit 110 may transfer information about a vehicle position, the autonomous driving path, and/or the driving plan to the external server. The external server may predict traffic information data using AI technology, or the like, based on the information collected from vehicles or autonomous vehicles and provide the predicted traffic information data to the vehicles or the autonomous vehicles.

The scope of the disclosure may be represented by the following claims, and it should be construed that all changes or modifications derived from the meaning and scope of the claims and their equivalents may be included in the scope of the disclosure.

Claims in the present description can be combined in a various way. For instance, technical features in method claims of the present description can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method.

What is claimed is:

1. A method for a first device to transmit a physical uplink control channel (PUCCH) to a base station, the method including:

generating multiplexing information including at least one of hybrid automatic repeat request (HARQ) feedback information for downlink (DL) transmission, an uplink (UL) positive scheduling request (PSR) for UL transmission or a device-to-device PSR for device-to-device transmission; and transmitting the multiplexing information in a single slot to the base station through the PUCCH, wherein the multiplexing information includes the UL PSR, the device-to-device PSR, and the HARQ feedback information based on that the device-to-device PSR satisfies a preconfigured condition and a priority of the device-to-device PSR is equal to a priority of the UL PSR.

2. The method of claim 1, wherein the multiplexing information further includes channel state information (CSI) feedback information for the DL transmission.

3. The method of claim 1, wherein the preconfigured condition includes at least one of a condition in which the device-to-device PSR is related to an device-to-device service having a latency budget requirement lower than a threshold, a condition in which the device-to-device PSR is related to an device-to-device service having a reliability requirement higher than a threshold, a condition in which the device-to-device PSR is related to an device-to-device service having a priority higher than a threshold or a condition in which the device-to-device PSR is related to a specific device-to-device service.

4. The method of claim 1, wherein the UL PSR has a highest priority among L UL PSRs related to the single slot, has a highest logical channel ID (LCID), has a lowest LCID, has a highest scheduling request configuration ID, has a lowest scheduling request configuration ID, is related to a service having a lowest latency requirement or is related to a service having a highest reliability requirement, and wherein the device-to-device PSR has a highest priority among M device-to-device PSRs related to the single slot, has a highest LCID, has a lowest LCID, has a highest scheduling request configuration ID, has a lowest scheduling request configuration ID, is related to a service having a lowest latency requirement or is related to a service having a highest reliability requirement, and wherein the L and the M are positive integers.

5. The method of claim 1, wherein the generating the multiplexing information includes:

determining Q UL PSRs among L UL PSRs related to the single slot;

determining W device-to-device PSRs among M device-to-device PSRs related to the single slot; and generating the multiplexing information based on the Q UL PSRs and the W device-to-device PSRs, wherein the Q UL PSRs have relatively high priorities among the L UL PSRs, have relatively high LCIDs, have relatively low LCIDs, have relatively high scheduling request configuration IDs, have relatively low scheduling request configuration IDs, are related to Q services having relatively high priorities, are related to Q services having relatively low latency requirement, or are related to Q services having relatively high reliability requirement, and wherein the W device-to-device PSRs have relatively high priorities among the M UL PSRs, have relatively high LCIDs, have relatively low LCIDs, have relatively high scheduling request configuration IDs, have relatively low scheduling request configuration IDs, are related to W services having relatively high priorities, are related to W services having relatively low latency requirement, or are related to W services having relatively high reliability requirement, and wherein the L, the Q, the M and the W are positive integers, the L is equal to or bigger than the Q, and the M is equal to or bigger than the W.

6. The method of claim 5, wherein generating the multiplexing information based on the Q UL PSRs and the W device-to-device PSRs includes:

determining a random UL PSR among the Q UL PSRs;

determining a random device-to-device PSR among the W device-to-device PSRs; and generating the multiplexing information based on the random UL PSR and the random device-to-device PSR, wherein probabilities that each of the Q UL PSRs are determined as the random UL PSR are all same, and wherein probabilities that each of the W device-to-device PSRs are determined as the random device-to-device PSR are all same, and wherein the random UL PSR is the UL PSR, and the random device-to-device PSR is the device-to-device PSR.

7. The method of claim 1, wherein generating the multiplexing information includes:

determining Q PSRs among L UL PSRs and M device-to-device PSRs related to the single slot; and generating the multiplexing information based on the Q PSRs, wherein the Q PSRs have relatively high priorities among the L UL PSRs and the M device-to-device PSRs, have relatively high LCIDs, have relatively low LCIDs, have relatively high scheduling request configuration IDs, have relatively low scheduling request configuration IDs, are related to Q services having relatively high priorities, are related to Q services having relatively low latency requirement, or are related to Q services having relatively high reliability requirement, and wherein the L, the M and the Q are positive integers.

8. The method of claim 7, wherein the Q is 1 or preconfigured 2 or more positive integer.

9. The method of claim 1, wherein generating the multiplexing information includes:

determining the UL PSR having a highest priority among L UL PSRs related to the single slot;

determining the device-to-device PSR having a highest priority among M device-to-device PSRs related to the single slot; and generating the multiplexing information based on a comparison between a priority of the UL PSR and a priority of the device-to-device PSR, wherein the multiplexing information is composed of the M device-to-device PSRs and the HARQ feedback information based on that a priority of the device-to-device PSR is greater than a priority of the UL PSR, and wherein the L and the M are positive integers.

10. A first device for transmitting a physical uplink control channel (PUCCH) to a base station, the first device comprising:

at least one transceiver:

at least one processor; and at least one memory connected to the at least one processor and storing instructions that, based on being executed, cause the first device to perform operations comprising:

generating multiplexing information including at least one of hybrid automatic repeat request (HARQ) feedback information for downlink (DL) transmission, an uplink (UL) positive scheduling request (PSR) for UL transmission or a device-to-device PSR for device-to-device transmission; and transmitting the multiplexing information in a single slot to the base station through the PUCCH, wherein the multiplexing information includes the UL PSR, the device-to-device PSR and the HARQ feedback information based on that the device-to-device PSR satisfies a pre-configured condition and a priority of the device-to-device PSR is equal to a priority of the UL PSR.

11. A processing device adapted to control a first device for transmitting a physical uplink control channel (PUCCH) to a base station, the processing device comprising:

at least one processor; and at least one memory connected to the at least one processor and storing instructions that, based on being executed, cause the at least one processor to perform operations comprising:

generating multiplexing information including at least one of hybrid automatic repeat request HARQ) feedback information for downlink (DL) transmission, an uplink (UL) positive scheduling request (PSR) for UL transmission or a device-to-device PSR for device-to-device transmission; and transmitting the multiplexing information in a single slot to the base station through the PUCCH, wherein the multiplexing information includes the UL PSR, the device-to-device PSR and the HARQ feedback information based on that the device-to-device PSR satisfies a preconfigured condition and a priority of the device-to-device PSR is equal to a priority of the UL PSR.

* * * * *